(12) United States Patent
Boyraz et al.

(10) Patent No.: US 11,474,530 B1
(45) Date of Patent: Oct. 18, 2022

(54) SEMANTIC NAVIGATION OF AUTONOMOUS GROUND VEHICLES

(71) Applicant: Amazon Technologies, Inc., Seattle, WA (US)

(72) Inventors: Hakan Boyraz, Seattle, WA (US); Sheng Chen, Seatle, WA (US); Aleksandar Kojic, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 16/541,755

(22) Filed: Aug. 15, 2019

(51) Int. Cl.
| | |
|---|---|
| *G05D 1/02* | (2020.01) |
| *G05D 1/00* | (2006.01) |
| *G06V 20/58* | (2022.01) |
| *G06V 20/00* | (2022.01) |

(52) U.S. Cl.
CPC ......... *G05D 1/0223* (2013.01); *G05D 1/0088* (2013.01); *G05D 1/0251* (2013.01); *G05D 1/0253* (2013.01); *G06V 20/38* (2022.01); *G06V 20/58* (2022.01)

(58) Field of Classification Search
CPC .. G05D 1/0223; G05D 1/0088; G05D 1/0251; G05D 1/0253; G06K 9/00697; G06K 9/00805
See application file for complete search history.

(56) References Cited

U.S. PATENT DOCUMENTS

| | | |
|---|---|---|
| 4,865,248 A | 9/1989 | Barth |
| 4,954,962 A | 9/1990 | Evans, Jr. et al. |
| 5,040,116 A | 8/1991 | Evans, Jr. et al. |
| 5,301,114 A | 4/1994 | Mitchell |
| 5,386,462 A | 1/1995 | Schlamp |
| 5,995,898 A | 11/1999 | Tuttle |

(Continued)

FOREIGN PATENT DOCUMENTS

| | | |
|---|---|---|
| EP | 2228779 A2 | 9/2010 |
| WO | 2015134376 A1 | 9/2015 |

OTHER PUBLICATIONS

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

(Continued)

*Primary Examiner* — Abby Y Lin
*Assistant Examiner* — Renee LaRose
(74) *Attorney, Agent, or Firm* — Athorus, PLLC

(57) ABSTRACT

Autonomous ground vehicles capture images during operation, and process the images to recognize ground surfaces or features within their vicinity, such as by providing the images to a segmentation network trained to recognize the ground surfaces or features. Semantic maps of the ground surfaces or features are generated from the processed images. A point on a semantic map is selected, and the autonomous ground vehicle is instructed to travel to a location corresponding to the selected point. The point is selected in accordance with one or more goals, such as to maintain the autonomous ground vehicle at a selected distance from a roadway or other hazardous surface, or along a centerline of a sidewalk.

20 Claims, 28 Drawing Sheets

(56) References Cited

U.S. PATENT DOCUMENTS

| | | |
|---|---|---|
| 6,344,796 B1 | 2/2002 | Ogilvie et al. |
| 6,426,699 B1 | 7/2002 | Porter |
| 6,504,530 B1 | 1/2003 | Wilson et al. |
| 6,690,997 B2 | 2/2004 | Rivalto |
| 6,694,217 B2 | 2/2004 | Bloom |
| 6,919,803 B2 | 7/2005 | Breed |
| 6,961,711 B1 | 11/2005 | Chee |
| 6,970,838 B1 | 11/2005 | Kamath et al. |
| 7,129,817 B2 | 10/2006 | Yamagishi |
| 7,133,743 B2 | 11/2006 | Tilles et al. |
| 7,188,513 B2 | 3/2007 | Wilson |
| 7,337,686 B2 | 3/2008 | Sagi-Dolev |
| 7,337,944 B2 | 3/2008 | Devar |
| 7,339,993 B1 | 3/2008 | Brooks et al. |
| 7,409,291 B2 | 8/2008 | Pasolini et al. |
| 8,321,128 B2 | 11/2012 | Park |
| 8,532,862 B2 | 9/2013 | Neff |
| 8,571,743 B1 | 10/2013 | Cullinane |
| 8,688,306 B1 | 4/2014 | Nemec et al. |
| 8,738,213 B1 | 5/2014 | Szybalski et al. |
| 8,855,847 B2 | 10/2014 | Uehara |
| 9,079,587 B1 | 7/2015 | Rupp et al. |
| 9,120,484 B1 | 9/2015 | Ferguson et al. |
| 9,147,296 B2 | 9/2015 | Ricci |
| 9,201,421 B1 | 12/2015 | Fairfield et al. |
| 9,294,474 B1 | 3/2016 | Alikhani |
| 9,381,916 B1 | 7/2016 | Zhu et al. |
| 9,440,647 B1 | 9/2016 | Sucan et al. |
| 9,558,664 B1 | 1/2017 | Gaebler et al. |
| 9,718,564 B1 | 8/2017 | Beckman et al. |
| 2001/0045449 A1 | 11/2001 | Shannon |
| 2002/0016726 A1 | 2/2002 | Ross |
| 2002/0087375 A1 | 7/2002 | Griffin et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2003/0040980 A1 | 2/2003 | Nakajima et al. |
| 2003/0097047 A1 | 5/2003 | Woltermann et al. |
| 2003/0141411 A1 | 7/2003 | Pandya et al. |
| 2003/0162523 A1 | 8/2003 | Kapolka et al. |
| 2004/0172167 A1 | 9/2004 | Pasolini et al. |
| 2006/0136237 A1 | 6/2006 | Spiegel et al. |
| 2006/0178140 A1 | 8/2006 | Smith et al. |
| 2007/0005609 A1 | 1/2007 | Breed |
| 2007/0016496 A1 | 1/2007 | Bar et al. |
| 2007/0073552 A1 | 3/2007 | Hileman |
| 2007/0150375 A1 | 6/2007 | Yang |
| 2007/0170237 A1 | 7/2007 | Neff |
| 2007/0244614 A1 | 10/2007 | Nathanson |
| 2007/0293978 A1 | 12/2007 | Wurman et al. |
| 2008/0059068 A1 | 3/2008 | Strelow et al. |
| 2008/0150679 A1 | 6/2008 | Bloomfield |
| 2008/0154659 A1 | 6/2008 | Bettes et al. |
| 2008/0161986 A1 | 7/2008 | Breed |
| 2008/0167817 A1 | 7/2008 | Hessler et al. |
| 2008/0301009 A1 | 12/2008 | Plaster et al. |
| 2009/0005985 A1 | 1/2009 | Basnayake |
| 2009/0062974 A1 | 3/2009 | Tamamoto et al. |
| 2009/0063166 A1 | 3/2009 | Palmer |
| 2009/0106124 A1 | 4/2009 | Yang |
| 2009/0149985 A1 | 6/2009 | Chirnomas |
| 2009/0236470 A1 | 9/2009 | Goossen et al. |
| 2009/0247186 A1 | 10/2009 | Ji et al. |
| 2009/0299903 A1 | 12/2009 | Hung et al. |
| 2009/0314883 A1 | 12/2009 | Arlton et al. |
| 2010/0012573 A1 | 1/2010 | Dendel et al. |
| 2010/0057360 A1 | 3/2010 | Ohkubo |
| 2010/0121573 A1 | 5/2010 | Imafuku et al. |
| 2010/0125403 A1 | 5/2010 | Clark et al. |
| 2010/0157061 A1 | 6/2010 | Katsman et al. |
| 2010/0241355 A1 | 9/2010 | Park |
| 2010/0250134 A1 | 9/2010 | Bornstein et al. |
| 2010/0312461 A1 | 12/2010 | Haynie et al. |
| 2011/0035149 A1 | 2/2011 | McAndrew et al. |
| 2011/0066377 A1 | 3/2011 | Takaoka |
| 2011/0071759 A1 | 3/2011 | Pande et al. |
| 2011/0112764 A1 | 5/2011 | Trum |
| 2011/0125403 A1 | 5/2011 | Smith |
| 2011/0208496 A1 | 8/2011 | Bando et al. |
| 2011/0264311 A1 | 10/2011 | Lee et al. |
| 2012/0039694 A1 | 2/2012 | Suzanne |
| 2012/0083960 A1 | 4/2012 | Zhu et al. |
| 2012/0109419 A1 | 5/2012 | Mercado |
| 2012/0219397 A1 | 8/2012 | Baker |
| 2013/0073477 A1 | 3/2013 | Grinberg |
| 2013/0081245 A1 | 4/2013 | Vavrina et al. |
| 2013/0148123 A1 | 6/2013 | Hayashi |
| 2013/0214925 A1 | 8/2013 | Weiss |
| 2013/0218799 A1 | 8/2013 | Lehmann et al. |
| 2013/0231824 A1 | 9/2013 | Wilson et al. |
| 2013/0238170 A1 | 9/2013 | Klinger et al. |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2013/0297099 A1 | 11/2013 | Rovik |
| 2014/0022055 A1 | 1/2014 | Levien et al. |
| 2014/0030444 A1 | 1/2014 | Swaminathan et al. |
| 2014/0032034 A1 | 1/2014 | Raptopoulos et al. |
| 2014/0052661 A1 | 2/2014 | Shakes et al. |
| 2014/0081507 A1 | 3/2014 | Urmson et al. |
| 2014/0095009 A1 | 4/2014 | Oshima et al. |
| 2014/0136133 A1 | 5/2014 | Fedele |
| 2014/0136414 A1* | 5/2014 | Abhyanker .......... G06Q 20/384 705/44 |
| 2014/0156133 A1 | 6/2014 | Cullinane et al. |
| 2014/0172290 A1 | 6/2014 | Prokhorov et al. |
| 2014/0188376 A1 | 7/2014 | Gordon |
| 2014/0200737 A1 | 7/2014 | Lortz et al. |
| 2014/0244678 A1 | 8/2014 | Zamer et al. |
| 2014/0254896 A1 | 9/2014 | Zhou et al. |
| 2014/0278052 A1 | 9/2014 | Slavin et al. |
| 2015/0006005 A1* | 1/2015 | Yu .......................... G06Q 50/28 701/22 |
| 2015/0069968 A1 | 3/2015 | Pounds |
| 2015/0102154 A1 | 4/2015 | Duncan et al. |
| 2015/0120602 A1 | 4/2015 | Huffman et al. |
| 2015/0129716 A1 | 5/2015 | Yoffe |
| 2015/0153175 A1 | 6/2015 | Skaaksrud |
| 2015/0153735 A1 | 6/2015 | Clarke et al. |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0193005 A1 | 7/2015 | Censo et al. |
| 2015/0227882 A1 | 8/2015 | Bhatt |
| 2015/0241878 A1 | 8/2015 | Crombez et al. |
| 2015/0246727 A1 | 9/2015 | Masticola et al. |
| 2015/0259078 A1 | 9/2015 | Filipovic et al. |
| 2015/0268665 A1 | 9/2015 | Ludwick et al. |
| 2015/0291032 A1 | 10/2015 | Kim et al. |
| 2015/0317597 A1 | 11/2015 | Shucker et al. |
| 2015/0332206 A1 | 11/2015 | Trew et al. |
| 2015/0345966 A1 | 12/2015 | Meuleau |
| 2015/0345971 A1 | 12/2015 | Meuleau et al. |
| 2015/0346727 A1 | 12/2015 | Ramanujam |
| 2015/0348112 A1 | 12/2015 | Ramanujam |
| 2015/0348335 A1 | 12/2015 | Ramanujam |
| 2015/0363986 A1 | 12/2015 | Hoyos et al. |
| 2015/0367850 A1 | 12/2015 | Clarke et al. |
| 2015/0370251 A1 | 12/2015 | Siegel et al. |
| 2016/0009413 A1 | 1/2016 | Lee et al. |
| 2016/0025973 A1 | 1/2016 | Gullag et al. |
| 2016/0033966 A1 | 2/2016 | Farris et al. |
| 2016/0068156 A1 | 3/2016 | Horii |
| 2016/0085565 A1 | 3/2016 | Arcese et al. |
| 2016/0093212 A1 | 3/2016 | Barfield et al. |
| 2016/0104099 A1 | 4/2016 | Villamar |
| 2016/0114488 A1 | 4/2016 | Medina et al. |
| 2016/0144734 A1 | 5/2016 | Wang et al. |
| 2016/0144959 A1 | 5/2016 | Meffert |
| 2016/0144982 A1 | 5/2016 | Sugumaran |

(56) References Cited

U.S. PATENT DOCUMENTS

| | | |
|---|---|---|
| 2016/0207627 A1 | 7/2016 | Hoareau et al. |
| 2016/0209220 A1 | 7/2016 | Laetz |
| 2016/0209845 A1 | 7/2016 | Kojo et al. |
| 2016/0216711 A1 | 7/2016 | Srivastava et al. |
| 2016/0247404 A1 | 8/2016 | Srivastava et al. |
| 2016/0257401 A1 | 9/2016 | Buchmueller et al. |
| 2016/0266578 A1 | 9/2016 | Douglas et al. |
| 2016/0288796 A1 | 10/2016 | Yuan |
| 2016/0299233 A1 | 10/2016 | Levien et al. |
| 2016/0300400 A1 | 10/2016 | Namikawa |
| 2016/0301698 A1 | 10/2016 | Katara et al. |
| 2016/0307449 A1 | 10/2016 | Gordon et al. |
| 2016/0334229 A1 | 11/2016 | Ross et al. |
| 2016/0364989 A1 | 12/2016 | Speasl et al. |
| 2016/0370193 A1 | 12/2016 | Maischberger et al. |
| 2017/0010613 A1 | 1/2017 | Fukumoto |
| 2017/0032315 A1 | 2/2017 | Gupta et al. |
| 2017/0096222 A1 | 4/2017 | Spinelli et al. |
| 2017/0098378 A1 | 4/2017 | Soundararajan et al. |
| 2017/0101017 A1 | 4/2017 | Streett |
| 2017/0164319 A1 | 6/2017 | Skaaksrud et al. |
| 2017/0167881 A1 | 6/2017 | Rander et al. |
| 2017/0301232 A1 | 10/2017 | Xu et al. |
| 2018/0134286 A1 | 5/2018 | Yi et al. |
| 2018/0307223 A1 | 10/2018 | Peeters et al. |
| 2019/0042859 A1* | 2/2019 | Schubert ............. B60W 60/001 |
| 2020/0249698 A1* | 8/2020 | Lu ........................ G05D 1/0088 |

OTHER PUBLICATIONS

DHL Trend Research, "Unmanned Aerial Vehicles in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

Mike Murphy, "Google wants to deliver packages from self-driving trucks," published Feb. 9, 2016, URL: https://qz.com/613277/google-wants-to-deliver-packages-from-self-driving-trucks/, 4 pages.

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.

URL: https://web.archive.org/web/20160804001046/https://www.starship.xyz/, download date: Aug. 4, 2016, 21 pages.

* cited by examiner

SEMANTIC MAP OF REGION SURROUNDING AGV AT TIME $t_1$

IMAGE CAPTURED FORWARD OF AGV

IMAGE CAPTURED FROM PORT SIDE OF AGV

IMAGE CAPTURED FROM STARBOARD SIDE OF AGV

AGV SELECTS GOAL BASED ON SEMANTIC MAP

AGV PROCEEDS TO GOAL BASED ON SEMANTIC MAP VIA CENTERLINE OF SIDEWALK AND MAINTAINS ROAD ON SELECTED SIDE

AGV PROCEEDS TO GOAL BASED ON SEMANTIC MAP VIA CENTERLINE OF SIDEWALK AND MAINTAINS ROAD ON SELECTED SIDE

AGV REACHES PREDETERMINED RANGE OF EXPECTED
LOCATION OF LANDMARK

LANDMARK DETECTED WITHIN IMAGE CAPTURED BY AGV

AGV EXECUTES COURSE CHANGE UPON DETECTING LANDMARK

AGV EXECUTES COURSE CHANGE UPON DETECTING LANDMARK

SEMANTIC NAVIGATION OF AUTONOMOUS GROUND VEHICLES

BACKGROUND

Autonomous ground vehicles, which are sometimes called unmanned ground vehicles or autonomous mobile robots, are being increasingly utilized in the performance of a number of commercial applications, personal tasks, and other functions. For example, autonomous ground vehicles have been utilized to complete deliveries of food products or other items to locations or personnel indoors or outdoors, to survey ground conditions, to monitor traffic, or to identify situations requiring alternative or additional assistance from humans or other machines.

Autonomous ground vehicles are often programmed or configured to autonomously navigate from one location to another location under their own power. Many autonomous ground vehicles are outfitted with components for determining information regarding a vehicle's position, orientation, velocity or acceleration. For example, some such mobile computer devices may include Global Positioning System (or "GPS") transceivers for determining positions using data received from one or more orbiting satellites, or cellular transceivers configured to estimate (e.g., triangulate) a position using signals received from one or more cellular telephone network towers or other network sources. Moreover, many autonomous ground vehicles also include compasses for determining directions, gyroscopes for determining orientations and accelerometers for sensing accelerations.

A GPS-enabled autonomous ground vehicle may determine its position by interpreting signals that are received from multiple GPS satellites, and use that position to determine a path or route to another position, via any number of intervening waypoints, or to determine whether the autonomous ground vehicle is traveling in accordance with such a path or route. A distance between an autonomous ground vehicle and a GPS satellite may be determined by calculating a "time of flight" between the GPS satellite and the autonomous ground vehicle for each such signal, which is assumed to travel at approximately the speed of light. Where three or more such signals are interpreted, the autonomous ground vehicle may be determined to be located at a specific point to within a certain degree of accuracy or tolerance, commonly on the order of two to ten meters.

Occasionally, position information determined using GPS satellites and GPS-enabled equipment may be inaccurate, irrelevant or unavailable. For example, like any computer-based system, most GPS-enabled equipment requires an initialization period during which the GPS position information determined by such equipment is unreliable. Furthermore, where an autonomous ground vehicle operates in an environment including many natural or artificial obstructions, such as tree limbs, office towers, mountains, walls or ceilings, the receipt of GPS signals by a GPS-enabled autonomous ground vehicle may be delayed or otherwise interpreted as having arrived in an untimely manner.

Moreover, even where GPS positions are determined by an autonomous mobile robot to within an acceptable degree of accuracy or tolerance, the GPS positions may be insufficient or unreliable for some purposes. For example, where an accurate position is desired in a dense, urban environment having a large number of individual locations (e.g., addresses or other points of interest) within a small, defined area, determining a precise location within the area may be of paramount importance. Likewise, while GPS-determined positions may be used to determine paths or routes, GPS satellites and receivers typically may not, by themselves, conclusively determine whether such paths or routes are clear or obstructed, or whether such paths or routes include surfaces formed from asphalt, cobblestones, concrete, gravel, soil or other substances.

DETAILED DESCRIPTION

Figure 1A:
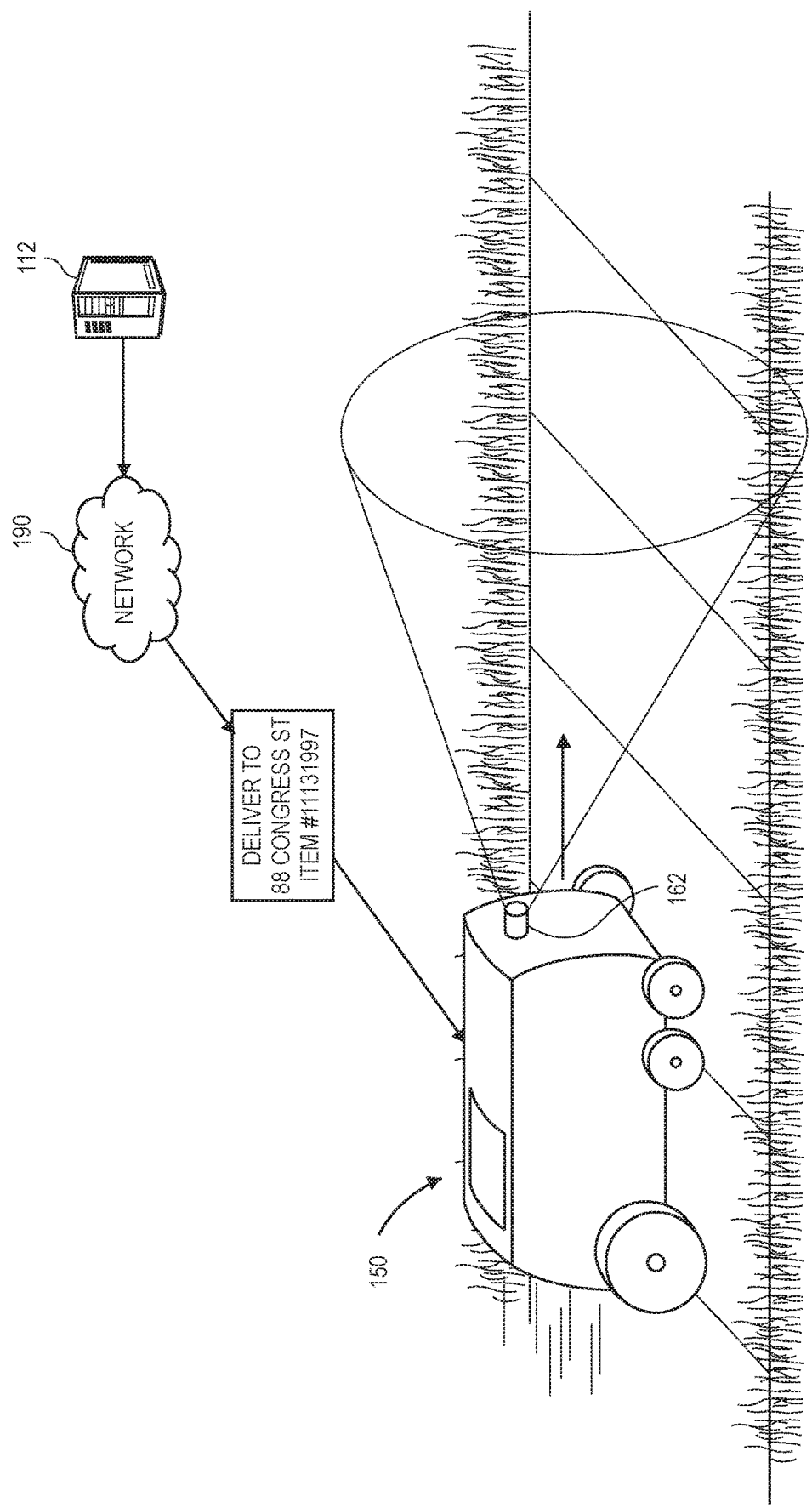
FIGS. 1A through 1F are views of aspects of one system for semantic navigation of autonomous ground vehicles in accordance with embodiments of the present disclosure.

As is set forth in greater detail below, the present disclosure is directed to semantic navigation of autonomous ground vehicles. More specifically, some embodiments of the systems and methods disclosed herein are directed to capturing imaging data by one or more imaging devices provided aboard an autonomous ground vehicle, processing the imaging data to recognize ground-based features within the imaging data, and establishing traveling goals for the autonomous ground vehicle based on the ground-based features. For example, where an autonomous ground vehicle is programmed to travel to a location, or to or through a plurality of locations, the autonomous ground vehicle may capture imaging data and generate a map or another representation of a region surrounding the autonomous ground vehicle. The region may be defined with respect to the images captured by the autonomous ground vehicle, and may have any dimensions or be constructed at any scale with respect to the autonomous ground vehicle.

Once the map or other representation has been generated, an autonomous ground vehicle may be configured to select one or more goals of a semantic nature for navigating to a desired location. For example, the autonomous ground vehicle may be configured to identify a point on a map and travel to that point, continuously updating the map while the autonomous ground vehicle is en route. The autonomous ground vehicle may be further configured to recognize one or more surface features within imaging data, and to travel along designated surface features (e.g., sidewalks), and not along others (e.g., lawns, puddles or roadways). The autonomous ground vehicle may also be configured to travel with such semantic goals in mind, such as by traveling along a sidewalk or other path in a manner that maintains a roadway on a designated side or beyond a designated range from the autonomous ground vehicle. Upon arriving at or near a point along a route at which a decision is required, e.g., whether to change course or speed in response to prevailing conditions or operational requirements, the autonomous ground vehicle may interpret imaging data captured thereby to search for one or more visual landmarks or other features, or to gather other information or data upon which a decision may be based.

The autonomous ground vehicles of the present disclosure may be configured for travel along paths that are straight or curvilinear in nature, and to execute changes in course or speed, as necessary. Furthermore, an autonomous ground vehicle may be configured to calculate or predict a centerline of a sidewalk or other path of a route, e.g., halfway between a left boundary of the sidewalk or the other path and a right boundary of the sidewalk or the other path, and to travel along the centerline of the sidewalk or the other path. Information or data regarding such courses or speeds, as well as locations or points through which an autonomous ground vehicle travel, may be selected in any manner, e.g., by one or more computer devices or systems residing aboard the autonomous ground vehicles, or by one or more other computer devices or systems in other locations, such as aboard one or more other vehicles for completing a delivery, or in one or more physical or virtual systems, e.g., a "cloud"-based environment.

Referring to FIGS. 1A through 1F, views of aspects of one system for semantic navigation of autonomous ground vehicles in accordance with embodiments of the present disclosure are shown. As is shown in FIG. 1A, a server 112 or other computer system is in communication with an autonomous ground vehicle 150 over a network 190, which may include the Internet in whole or in part. The server 112 transmits one or more instructions to the autonomous ground vehicle 150, including one or more instructions to deliver an item to a designated location.

Figure 1B:
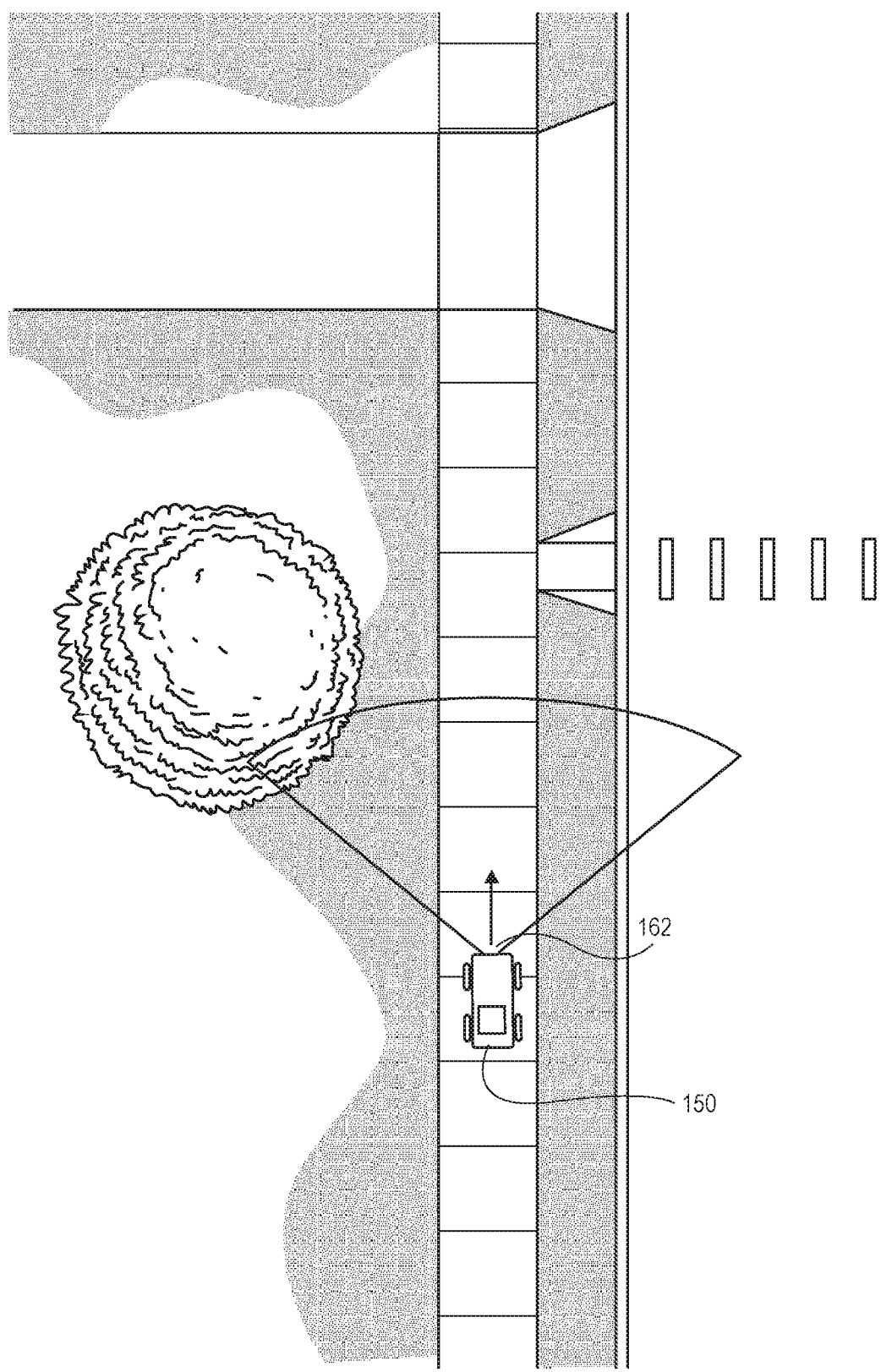

As is shown in FIGS. 1A and 1B, autonomous ground vehicle 150 may be outfitted with an imaging device 162 for capturing images from a field of view extending forward of the autonomous ground vehicle 150, at least in part. Alternatively, or additionally, the autonomous ground vehicle 150 may further include one or more other sensors for capturing information or data, such as one or more additional imaging devices (not shown), which may be aligned in any orientation with respect to a direction of travel of the autonomous ground vehicle 150, such as forward of the autonomous ground vehicle 150, or to port or starboard sides of the autonomous ground vehicle 150, or in any other orientation.

As is further shown in FIGS. 1A and 1B, the autonomous ground vehicle 150 is traveling along a sidewalk, which may be formed from any suitable or durable material, including but not limited to asphalt, bituminous pavement, bricks, cement, cobblestone, composite materials, concrete, dirt, grass, gravel, pavers, or any other materials. The autonomous ground vehicle 150 may travel on a course and at a speed that may be selected or otherwise determined in accordance with one or more goals, such as an extent of power available to the autonomous ground vehicle 150, operational capacities or constraints of the autonomous ground vehicle 150, topography of a region in which the autonomous ground vehicle 150 is operating, prevailing weather or surface conditions within the region, a time at which the autonomous ground vehicle 150 is expected or desired at one or more locations, or any other relevant factor. For example, in some embodiments, the autonomous ground vehicle 150 may begin traveling on a course corresponding to an initial trajectory from a location of the autonomous ground vehicle 150 to a location of a destination for a delivery of the ordered item, which may be determined based on geolocations of the autonomous ground vehicle 150 and the destination, or in any other manner.

In accordance with some embodiments of the present disclosure, the autonomous ground vehicle 150 is programmed or otherwise configured to generate semantic maps of a region in which the autonomous ground vehicle 150 operates based on imaging data captured using the imaging device 162 or any other imaging devices provided aboard the autonomous ground vehicle 150 (not shown). For example, in some embodiments, one or more computer processors, devices or systems provided aboard the autonomous ground vehicle 150 (not shown) may be configured to process images captured using the imaging device 162, and to detect, recognize or identify one or more ground surfaces within a vicinity of the autonomous ground vehicle based on such images. In some embodiments, the autonomous ground vehicle 150 may semantically segment such images, such as by assigning labels to one or more pixels or sets of pixels depicted within the images. The labels may indicate whether such pixels depict certain types or categories of ground surfaces, e.g., not only sidewalks but also roads, driveways, lawns or other surfaces. Alternatively, or additionally, such labels may indicate whether such surfaces are formed from one or more specific materials, or whether one or more of the surfaces are passable or desirable for travel thereon by the autonomous ground vehicle 150, or whether one or more of the surfaces are impassable or undesirable for travel thereon by the autonomous ground vehicle 150.

In some embodiments, ground surfaces may be identified, or labels may be assigned to such ground surfaces, using one or more machine learning tools or systems. For example, in some embodiments, images captured using the imaging device 162 may be provided as inputs to a machine learning tool or system, such as an artificial neural network, e.g., a convolutional neural network, that may be trained to generate outputs indicative of the corresponding surfaces depicted within such images. The machine learning tool or system may be operated using one or more computer processors, devices or systems provided aboard the autonomous ground vehicle 150, or by one or more other physical or virtual systems, e.g., a "cloud"-based environment. Alternatively, the ground surfaces may be identified, or labels may be assigned to such ground surfaces, using any method or technique in accordance with the present disclosure.

Figure 1C:
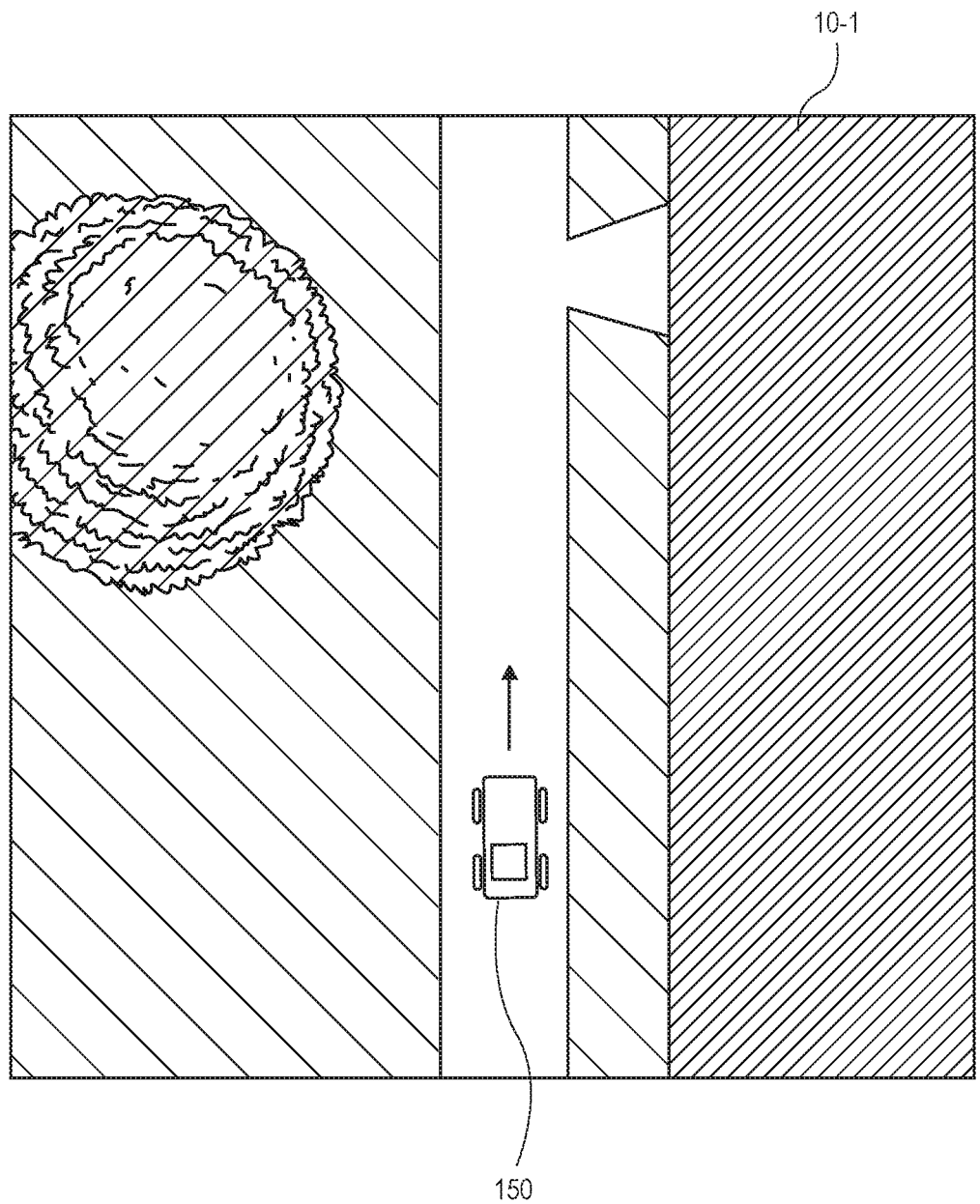

After semantically segmenting the images, a semantic map or other two-dimensional representation of the surfaces within the region in which the autonomous ground vehicle 150 is operating, such as the semantic map 10-1 shown in FIG. 1C, may be generated. The semantic map 10-1 includes labels of each of the pixels or sets of pixels depicted within segments of the images, or identifiers associated with such pixels (e.g., specific colors or textures assigned to respective segments or ground surfaces identified as being associated with such segments). The semantic map 10-1 may also have dimensions or levels of resolution or scale that are defined or selected on any basis, such as operational properties or capacities of the imaging device 162, attributes of the autonomous ground vehicle 150, or the segments or images themselves. After the semantic map 10-1 is generated, the autonomous ground vehicle 150 may identify a point on the semantic map 10-1 that is consistent with one or more goals of the autonomous ground vehicle 150, e.g., a delivery of an item to the destination in accordance with instructions received from the server 112, or any other point on the semantic map 10-1, and may generate or execute one or more instructions for causing the autonomous ground vehicle 150 to travel to a location corresponding to the selected point.

The autonomous ground vehicle 150 may utilize semantic maps in selecting courses and/or speeds for performing a mission, such as a delivery of an item to a destination, and such semantic maps may be updated or new semantic maps may be generated as images are captured by the imaging device 162, or at regular intervals of time, e.g., once every second or fraction of a second, or after a regular number of images have been captured, e.g., once every ten images, fifteen images, or twenty images.

Figure 1D:
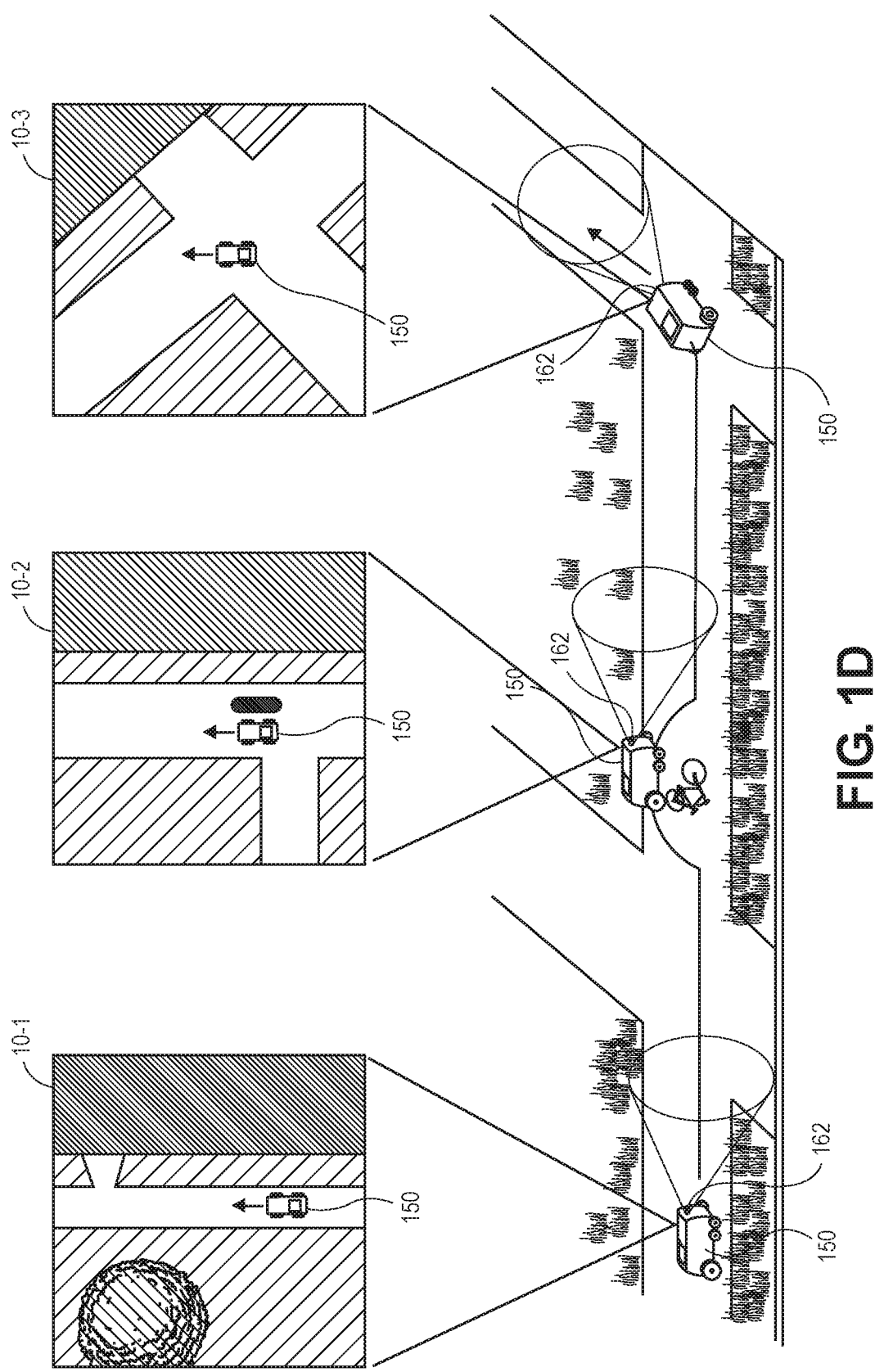

As is shown in FIG. 1D, the autonomous ground vehicle 150 may determine a course and/or a speed for traveling to a location corresponding to a selected point associated with one or more goals. For example, such goals may include not only traveling to a location associated with the selected point but also safely maintaining a roadway or another surface represented within the semantic map 10-1 at a sufficient distance from the autonomous ground vehicle 150, e.g., on a selected side of the autonomous ground vehicle 150, or remaining along or near a centerline of a sidewalk or other surface upon which the autonomous ground vehicle 150 travels, e.g., a line or series of midpoints between boundaries on a left side and a right side of the sidewalk or the other surface, or any other goals. While traveling to the location, the autonomous ground vehicle 150 may rely upon the semantic map 10-1 in selecting or modifying one or more of the course or the speed, e.g., to remain on passable or desirable ground surfaces, or to avoid impassable or undesirable ground surfaces, or other obstacles, and continuing to travel in furtherance of one or more goals.

Additionally, as is also shown in FIG. 1D, as the autonomous ground vehicle 150 continues to travel along courses or speeds selected based on one or more semantic maps, e.g., the semantic map 10-1, additional images are captured using the imaging device 162. The autonomous ground vehicle 150 may then generate another semantic map 10-2 including labels corresponding to each of a plurality of pixels (or sets of pixels) depicted within segments of images subsequently captured using the imaging device 162, and may rely upon the semantic map 10-2 in selecting or modifying courses or speeds, e.g., to remain on passable or desirable ground surfaces, or to avoid impassable or undesirable ground surfaces, or other obstacles. Similarly, as is further shown in FIG. 1D, as the autonomous ground vehicle 150 travels along courses or speeds selected based on the semantic map 10-2, and additional images are captured using the imaging device 162, another semantic map 10-3 including labels corresponding to each of a plurality of pixels (or sets of pixels) depicted within segments of the subsequently captured images may be generated, and the autonomous ground vehicle 150 may rely upon the semantic map 10-3 in selecting or modifying courses or speeds for continued travel. The autonomous ground vehicle 150 may continue to select points within each of the semantic maps, e.g., the semantic maps 10-2, 10-3 shown in FIG. 1D, and to travel to locations corresponding to such points at one or more selected courses or speeds, and in furtherance of one or more goals.

Figure 1E:
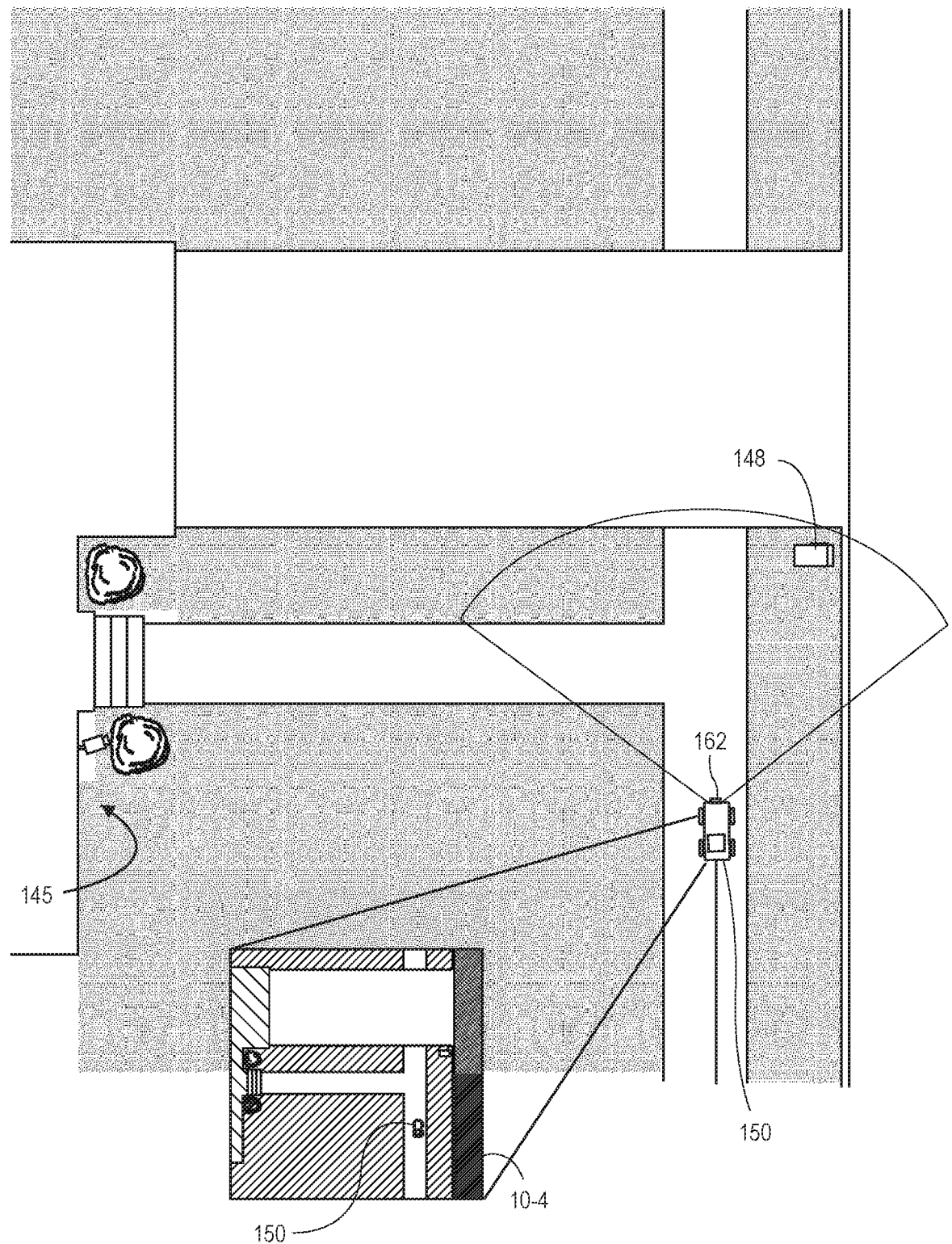
Figure 1F:
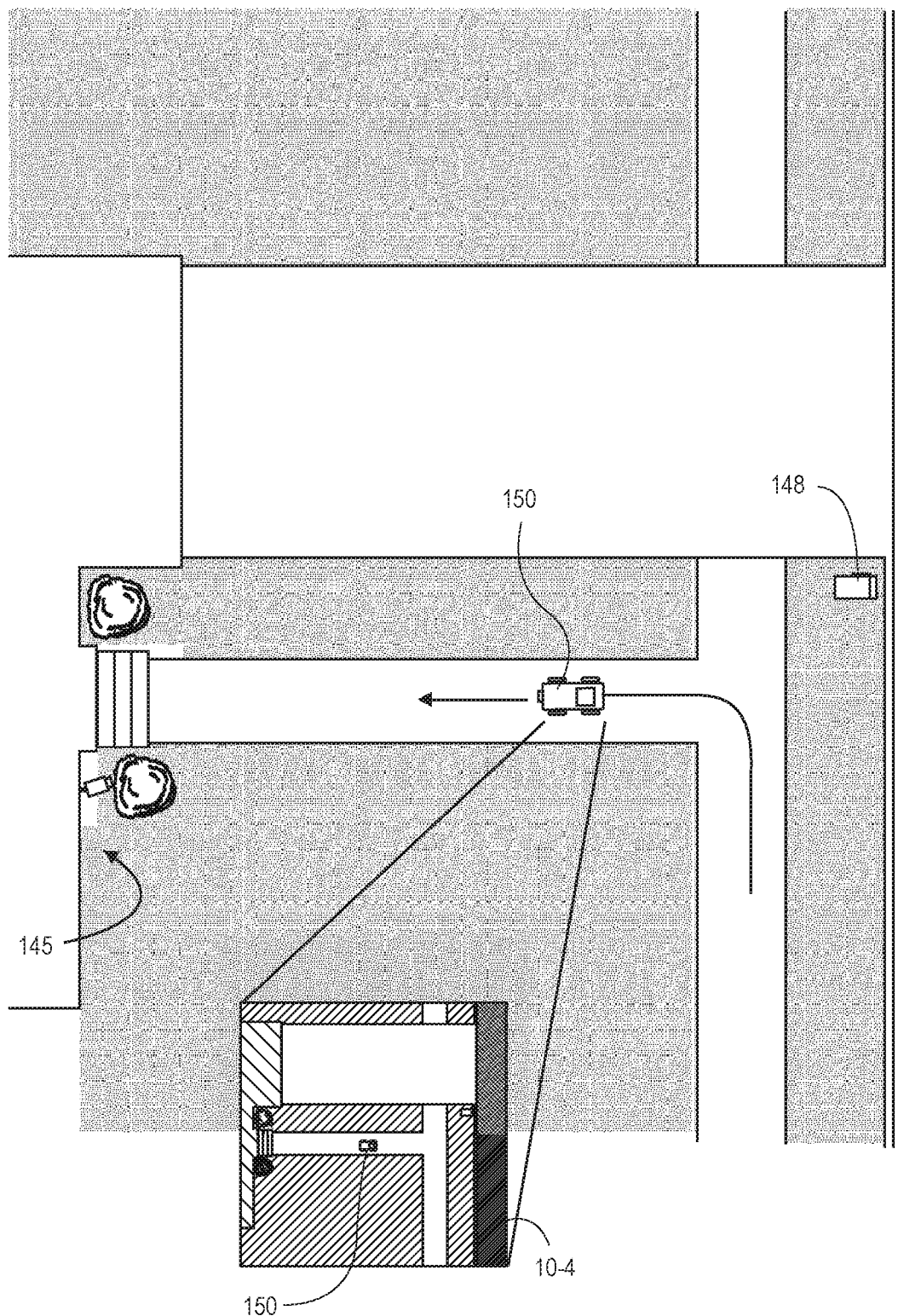

As is shown in FIG. 1E, one or more goals may call for the autonomous ground vehicle 150 to search for one or more landmarks associated with a destination either continuously, e.g., as each of the images is captured by the imaging device 162, or upon the occurrence of one or more additional events. For example, when the autonomous ground vehicle 150 approaches a location associated with a destination, or a location where the one or more landmarks may be expected to be found, the autonomous ground vehicle 150 may be configured to process one or more images captured thereby to detect or recognize one or more of the landmarks, and to determine whether the autonomous ground vehicle 150 has arrived at the location. As is also shown in FIG. 1E, the autonomous ground vehicle 150 may continue to capture images, and to generate a semantic map 10-4 describing ground surfaces depicted within one or more of the captured images. Additionally, the autonomous ground vehicle 150 may be further configured to search for a landmark, such as a mailbox 148, associated with a destination 145. For example, the autonomous ground vehicle 150 may recognize the mailbox 148 within one or more of such images, or within a semantic map generated based on such images, e.g., the semantic map 10-4. The autonomous ground vehicle 150 may execute one or more decisions in response to detecting the mailbox 148. For example, as is shown in FIG. 1F, the autonomous ground vehicle 150 may be configured to execute a change in one or more of a course or a speed, and to turn toward the destination 145 to complete a delivery of the ordered item. The autonomous ground vehicle 150 may then search for an additional landmark associated with the destination, e.g., a porch, a set of stairs, or a door, and deposit the ordered item at the destination 145, deliver the ordered item to one or more personnel at the destination 145, or take any other action to complete the delivery.

Accordingly, the systems and methods of the present disclosure are directed to the semantic navigation of autonomous ground vehicles. In some embodiments, an autonomous ground vehicle may begin traveling from a first location (e.g., an origin) to a second location (e.g., a destination, or to one or more decision points or waypoints between the origin and the destination) on a course and at a speed that may be selected on any basis. While en route to the second location, the autonomous ground vehicle captures imaging data and processes the imaging data (e.g., video images) to detect and recognize information regarding ground surfaces within a vicinity of the autonomous ground vehicle. Imaging data may be processed in any manner, such as by providing the imaging data to a segmentation network (e.g., a convolutional neural network or another artificial neural network) that is configured to segment the ground surfaces into discrete regions, such as by assigning labels corresponding to one of a plurality of ground surfaces to pixels or sets of pixels depicted within the imaging data. A semantic map including the regions corresponding to various ground surfaces is generated. An autonomous ground vehicle may select one or more points within a semantic map associated with the completion of a goal, such as a delivery of an ordered item to a destination by way of an optimal path or route. In some embodiments, an initial course and an initial speed may be selected for an autonomous ground vehicle in any manner or on any basis. For example, the initial trajectory may be selected based on locations of an origin and a destination for the autonomous ground vehicle, e.g., a Great Circle route between the locations, subject to any known obstructions or restrictions. Alternatively, an initial course and an initial speed may be determined based on an initial semantic map generated based on a single image captured using the imaging device 162, or on any other basis.

An autonomous ground vehicle may be configured to select a course and a speed for traveling to locations corresponding to selected points on semantic maps in furtherance of one or more goals. For example, in some embodiments, the autonomous ground vehicle may detect a roadway upon which larger and heavier vehicles travel at substantially higher speeds, or a body of water or other surfaces that are impassable or undesirable for travel by the autonomous ground vehicle, and generate or execute one or more sets of instructions for causing the autonomous ground vehicle to travel at a safe distance from the roadway or other surfaces, or to maintain the roadway or other surfaces on a selected side of the autonomous ground vehicle. Additionally, in some embodiments, the autonomous ground vehicle may also detect a sidewalk or other desirable or passable surfaces within imaging data, and generate or execute one or more sets of instructions for traveling on a trajectory (e.g., a course) toward an intended destination that causes the autonomous ground vehicle to remain on a centerline or another specified portion of the sidewalk or other surfaces. Any type or form of goal may be established using a semantic map generated in accordance with the present disclosure, and an autonomous ground vehicle may be programmed to generate or execute one or more sets of instructions for causing the autonomous ground vehicle to operate in furtherance of the goal.

Semantic maps that are generated based on semantically segmented images in accordance with the present disclosure may have any dimensions or shapes. For example, a semantic map may have real or scaled dimensions on the order of five meters, ten meters, fifteen meters, twenty meters or more, as well as shapes such as circles, ellipses, rectangles other than squares, cones or sectors, or any others. Additionally, a semantic map may consider or include a location of the autonomous ground vehicle at a geometric center of the semantic map, or in any other location within or outside of the semantic map.

In some embodiments, a semantic map generated in accordance with the present disclosure may be utilized as a primary source of data for traveling to one or more locations associated with a route or path, or in furtherance of one or more goals. Alternatively, in some embodiments, a semantic map may be utilized as a secondary source of data for traveling to one or more locations associated with a route or path, or in furtherance of one or more goals. For example, in some embodiments, a semantic map may have real or scaled dimensions that are larger than an area of uncertainty associated with a positioning system, e.g., GPS, such that the semantic map may be utilized in finely selecting courses or speeds for an autonomous ground vehicle with greater granularity or specificity than one or more sets of GPS-determined positions. As is discussed above, in some embodiments, an autonomous ground vehicle may be generally programmed or configured to travel along one or more courses or at one or more speeds through or between two or more GPS-determined locations. The autonomous ground vehicle may be further programmed or configured to specifically choose one or more course variations or speed variations while traveling through or between the GPS-determined locations based on semantic maps that are generated and updated in accordance with the present disclosure, in furtherance of one or more goals.

Additionally, in some embodiments, the autonomous ground vehicles of the present disclosure may be configured to search for one or more landmarks or other visual identifiers within a vicinity of one or more locations, e.g., a destination, or one or more decision points or waypoints between an origin and the destination. For example, a landmark may be a general type or form of object, e.g., a fire hydrant, a street sign, a mailbox, an automobile, or any other object. Alternatively, in some other embodiments, the landmark may be a specific type or form of object, e.g., a street sign having specific words or symbols thereon, a specific building such as a home, an office or another structure, a specific automobile, or any other object. The autonomous ground vehicle may be configured to take one or more actions in response to detecting or recognizing a landmark that is depicted within imaging data, or represented within a semantic map generated from the imaging data. For example, the autonomous ground vehicle may be configured to execute one or more changes in course or speed, to determine that a goal has been accomplished, or to establish a new goal, upon detecting or recognizing the landmark.

The autonomous ground vehicles of the present disclosure may be vehicles having any number of wheels mounted to axles that may be rotated by one or more motors, with dimensions, masses or other indicators of size that may be selected on any basis. For example, in some embodiments, the autonomous ground vehicles may be sized and configured to travel on roads, sidewalks, crosswalks, bicycle paths, trails or the like, as well as yards, parking lots, driveways, patios or other surfaces, at various times or during various levels of congestion, and at various speeds, e.g., in response to one or more computer-based instructions.

Additionally, autonomous ground vehicles of the present disclosure may include a cargo bay or other storage compartment, or multiple cargo bays or storage compartments, for maintaining items therein at any desired temperature, pressure or alignment or orientation, and to protect such items against the elements. Furthermore, in some embodiments, the autonomous ground vehicles may include various equipment or components for determining whether a cargo bay or other storage compartment is empty or includes one or more items, or for identifying specific items that are stored therein, along with equipment or components for engaging or interacting with such items. The autonomous ground vehicles may also include one or more display screens (e.g., touchscreen displays, scanners, keypads) having one or more user interfaces for displaying information regarding such vehicles or their contents to humans, or for receiving interactions (e.g., instructions) from such humans, or other input/output devices for such purposes.

Moreover, the autonomous ground vehicles of the present disclosure may include any number of sensors such as position sensors (e.g., GPS receivers, or cellular transceivers configured to triangulate positions based on signals received from multiple cellular transmitters), imaging sensors (e.g., digital cameras or other imaging devices) or other sensors, including but not limited to speedometers, inclinometers, compasses, altimeters, gyroscopes or scanners. The autonomous ground vehicles of the present disclosure may also include communications equipment (e.g., wired or wireless means for communication such as components or systems operating Wireless Fidelity, Bluetooth, near-field communications or cellular technologies or protocols), along with one or more power modules (e.g., batteries), which may be rechargeable, refuelable or replaceable in nature. Information or data obtained or determined by such sensors or such communications equipment may be utilized in manually or automatically controlling an autonomous ground vehicle, e.g., in causing the autonomous ground vehicle to travel along one or more paths or routes, to search for alternate paths or routes, or to avoid expected or unexpected hazards encountered by the autonomous ground vehicle while traveling along such paths or routes. The autonomous ground vehicles of the present disclosure may further include any number of computer components (e.g., processors, data stores, transceivers or input/output devices) for performing any of the tasks or executing any of the functions described herein.

In some embodiments, the autonomous ground vehicles of the present disclosure may also be outfitted or equipped with one or more position sensors, which may be GPS sensors, microchips or other components that determine locations by interpreting signals received from one or more GPS satellites, or associated with any other positioning system. In the United States, the GPS system comprises a plurality of satellites that circle the planet every twelve hours at an altitude of approximately eleven thousand nautical miles, and are maintained aloft by the United States Air Force. GPS-enabled devices typically operate by measuring the transit times of signals received from multiple satellites, which generally travel at the speed of light, and determining distances to the respective satellites based on the transit times. Using three or more such signals, an approximate position of a computer device may be determined to within a defined degree or level of accuracy. By some estimates, American GPS satellites may provide users with an accuracy level of approximately 7.8 meters (m), ninety-five percent of the time, anywhere around the planet. Other positioning systems, such as the Global Navigation Satellite System (or "GLONASS") operated by Russia, the Galileo GNSS System operated by the European Space Agency, or the BeiDou Navigation Satellite System operated by China, also rely on satellites to provide position data to ground-based receivers.

In still other embodiments, autonomous ground vehicles may be programmed or otherwise configured to automatically access one or more predetermined or specified locations, e.g., to automatically deliver an item to a given location or to retrieve items from the given location. For example, an autonomous ground vehicle may be programmed or instructed to automatically open a door or other entry point at a facility (e.g., a private dwelling or business location), to access a public garage or other parking or standing area, or to activate an indicator within a home, an office or another structure. An autonomous ground vehicle may be configured to transmit wireless codes, signals or other information to trigger a response from one or more devices or machines equipped with wireless transceivers, such as garage door openers, doorbells, lights, haptic feedback systems or other machines or devices. Alternatively, requests or instructions for granting access to locations on behalf of an autonomous ground vehicle may be transmitted by one or more external computer devices or resources to one or more devices associated with structures at the locations, and access to such locations may be granted accordingly. Such requests or instructions may include access codes, authenticators, keys, tokens or similar information, which may be used by an autonomous ground vehicle to obtain access to one or more structures at a given location.

The autonomous ground vehicles of the present disclosure may be configured for travel on any type or form of surfaces associated with a transportation infrastructure network. In some embodiments, the autonomous ground vehicle may be particularly configured for travel on sidewalks or other limited access passageways that are generally designed for travel by humans or other animals on foot, or by lightweight vehicles such as strollers or bicycles. For example, in some embodiments, sidewalks or like passageways traveled upon by autonomous ground vehicles of the present disclosure may include residential sidewalks, commercial sidewalks, or any other type or form of sidewalks, which may be formed from any material, including but not limited to asphalt, bituminous pavement, bricks, cement, cobblestone, composite materials, concrete, dirt, grass, gravel, pavers, or any other materials.

Additionally, sidewalks may include various frontage zones or buffer zones and may be defined or established with respect to neighboring parcels (e.g., front yards, buildings, parking lots) by curbs, fences, walls, or other natural or artificial barriers of any type or form. Additionally, such sidewalks may include or be positioned near lights (e.g., street lights), furniture (e.g., benches, chairs, tables or planters), parking facilities (e.g., parking spaces and/or meters), shelters for passengers awaiting livery vehicles, buses or trains, as well as commercial vehicles such as trucks, vans or carts. Sidewalks may also include aprons, ramps, stairs, warning strips, or other facilities. Sidewalks may have any appropriate shapes or dimensions (e.g., widths, lengths, thicknesses), and may be flat or aligned at any angle or pitch, which may be selected on any basis or factor relating to anticipated travel thereon during use.

Those of ordinary skill in the pertinent arts will recognize that the autonomous ground vehicles of the present disclosure are not limited to traveling on sidewalks, however.

Figure 2A:
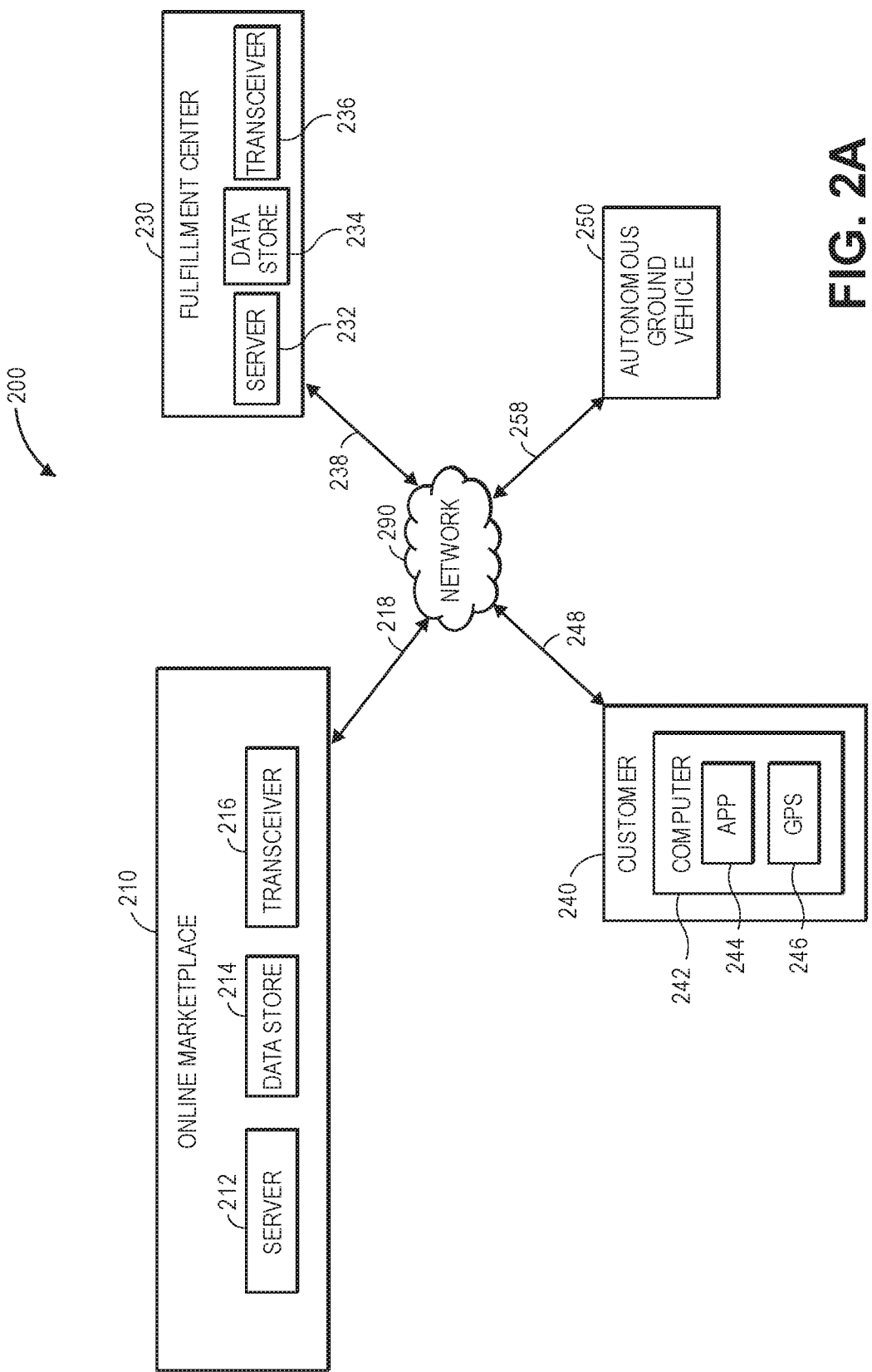
FIGS. 2A and 2B are block diagrams of components of one system for semantic navigation of autonomous ground vehicles in accordance with embodiments of the present disclosure.
Figure 2B:
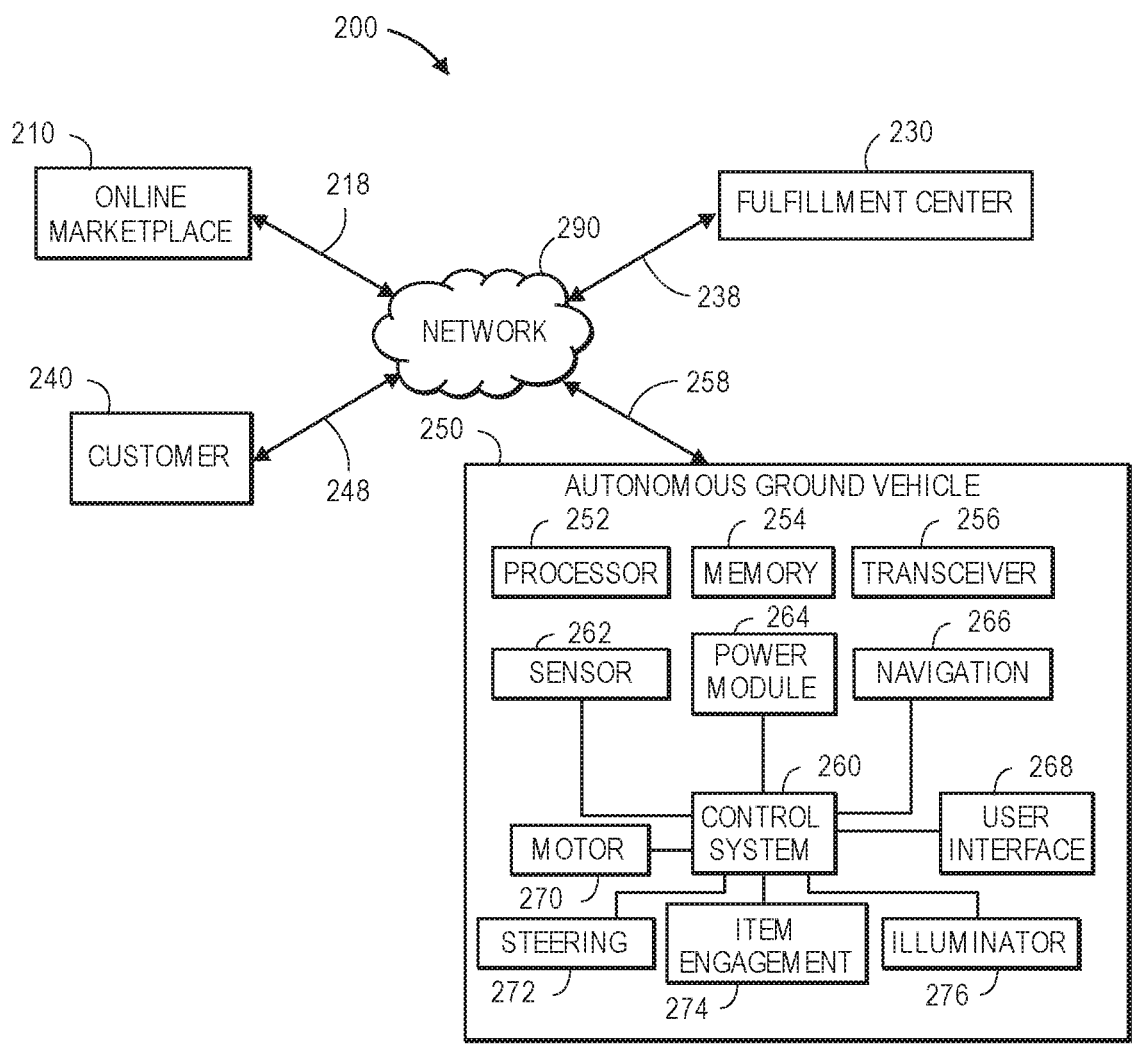

Referring to FIGS. 2A and 2B, a block diagram of components of one system 200 for semantic navigation of autonomous ground vehicles in accordance with embodiments of the present disclosure is shown. The system 200 includes an online marketplace (or electronic marketplace, or marketplace) 210, a fulfillment center 230, a customer 240 and an autonomous ground vehicle 250 that are connected to one another across a network 290, which may include the Internet in whole or in part. Except where otherwise noted, reference numerals preceded by the number "2" in FIG. 2A or FIG. 2B refer to elements that are similar to elements having reference numerals preceded by the number "1" shown in FIGS. 1A through 1F.

The online marketplace 210 may be any entity or individual that wishes to make items (which may include goods, products, services or information of any type or form) from a variety of sources (e.g., vendors, manufacturers, merchants or sellers) available for download, purchase, rent, lease or borrowing by customers using a networked computer infrastructure, including one or more physical computer servers 212 and data stores 214 (e.g., databases) for hosting one or more network sites and one or more transceivers 216 or other communications systems.

The marketplace 210 may be physically or virtually associated with one or more storage or distribution facilities, such as the fulfillment center 230, and may implement the one or more network sites using the one or more servers 212, e.g., by connecting or otherwise communicating with the one or more data stores 214 as well as the network 290, through the sending and receiving of digital data as indicated by line 218. Moreover, the data stores 214 may include any type of information regarding items that have been made available for sale through the marketplace 210, or ordered by customers, such as the customer 240, from the marketplace 210, or any information or data regarding the delivery of such items to the customers. The data stores 214 may include any information or data regarding customers and items that the customers prefer or disfavor, including but not limited to histories of searching or browsing for information or data regarding such items, e.g., by way of one or more network sites maintained by the marketplace 210, or histories of purchasing such items or considering such items for purchase.

The server 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (or "ISA"), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the data stores 214 may be implemented using any suitable memory technology, such as random-access memory (or "RAM"), static RAM (or "SRAM"), synchronous dynamic RAM (or "SDRAM"), nonvolatile/ Flash-type memory, or any other type of memory. The transceiver 216 may be configured to enable the online marketplace 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the online marketplace 210, or to one or more other computer devices or systems (e.g., the autonomous ground vehicle 250 or one or more other vehicles, not shown) via the network 290. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The fulfillment center 230 may be any facility that is adapted to receive, store, process and/or distribute items. As is shown in FIG. 2A, the fulfillment center 230 includes a server 232, a data store 234, and a transceiver 236. The fulfillment center 230 also includes stations for receiving, storing and distributing items to customers.

The server 232 and/or the data store 234 may operate one or more order processing and/or communication systems and/or software applications having one or more user interfaces, or communicate with one or more other computing devices or machines that may be connected to the network 290, as indicated by line 238, for transmitting or receiving information in the form of digital or analog data, or for any other purpose. For example, the server 232 and/or the data store 234 may also operate or provide access to one or more reporting systems for receiving or displaying information or data regarding orders for items received by the marketplace 210, and may provide one or more interfaces for receiving interactions (e.g., text, numeric entries or selections) from one or more operators, users, workers or other persons in response to such information or data. The server 232, the data store 234 and/or the transceiver 236 may be components of a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding workflow operations, or the interactions received from the one or more operators, users, workers or persons.

For example, the server 232 and/or the data store 234 may be configured to determine an optimal path or route between two locations for the execution of a given mission or task to be executed by the autonomous ground vehicle 250, or by any other vehicle (not shown), such as according to one or more traditional shortest path or shortest route algorithms such as Dijkstra's Algorithm, Bellman-Ford Algorithm, Floyd-Warshall Algorithm, Johnson's Algorithm or a hub labeling technique. Additionally, the server 232 and/or the data store 234 may be configured to control or direct, or to recommend or suggest, collaboration between or among the customer 240 and/or one or more of the autonomous mobile vehicle 250, or any other vehicles, in the performance of one or more tasks or in the execution of one or more functions. For example, the server 232 and/or the data store 234 may identify appropriate locations or rendezvous points where one or more humans, vehicles or other machines, e.g., the customer 240 and/or one or more of the autonomous mobile vehicles 250, may meet in order to transfer inventory or materials therebetween, or for any other purpose.

The transceiver 236 may be configured to enable the fulfillment center 230 to communicate through one or more wired or wireless means, e.g., wired technologies such as Universal Serial Bus (or "USB") or fiber optic cable, or standard wireless protocols such as Bluetooth® or any Wi-Fi protocol, such as over the network 290 or directly. The transceiver 236 may include one or more of the properties or features of the transceiver 216 described herein, or any other properties or features.

The fulfillment center 230 may further include one or more control systems that may generate instructions for conducting operations at one or more receiving stations, storage areas and/or distribution stations. Such control systems may be associated with the server 232, the data store 234 and/or the transceiver 236, or with one or more other computing devices or machines, and may communicate by any known wired or wireless means, or with the online marketplace 210, the customer 240 or the autonomous mobile robot 250 over the network 290, as indicated by line 238, through the sending and receiving of digital data.

Additionally, the fulfillment center 230 may include one or more systems or devices (not shown in FIG. 2A or FIG. 2B) for locating or identifying one or more elements therein, such as cameras or other image recording devices. Furthermore, the fulfillment center 230 may also include one or more workers or staff members (not shown in FIG. 2A or FIG. 2B), who may handle or transport items within the fulfillment center 230. Such workers may operate one or more computing devices or machines for registering the receipt, retrieval, transportation or storage of items within the fulfillment center, or a general-purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 240 may be any entity or individual that wishes to download, purchase, rent, lease, borrow or otherwise obtain items (which may include goods, products, services or information of any type or form) from the online marketplace 210 or the fulfillment center 230, e.g., for delivery to a selected destination, or by any other means. The customer 240 may utilize one or more computing devices 242 (e.g., a smartphone, a tablet computer, a laptop computer, a desktop computer, a smart speaker, or computing devices provided in wristwatches, televisions, set-top boxes, automobiles or any other appliances or machines), or any other like machine, that may operate or access one or more software applications 244, such as a web browser or a shopping application, and may be connected to or otherwise communicate with the online marketplace 210, the fulfillment center 230 or the autonomous ground vehicle 250 through the network 290, as indicated by line 248, by the transmission and receipt of digital data.

The autonomous ground vehicle 250 may be any type or form of self-powered vehicle capable of being programmed or otherwise configured for autonomous travel between two points along one or more paths or routes, in the performance of one or more missions or tasks, based on one or more computer instructions. For example, one or more of the autonomous ground vehicle 250 may be configured to determine an optimal path or route between two locations for the execution of a given mission or task on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. Such optimal paths or routes may, in some embodiments, include one or more common locations or rendezvous points where an item or materials may be transferred between or among the autonomous ground vehicle 250, or one or more humans, machines or other vehicles.

As is shown in FIG. 2B, the autonomous ground vehicle 250 may include one or more computer components such as a processor 252, a memory 254 and a transceiver 256 in communication with one or more other computer devices that may be connected to the network 290, as indicated by line 258, in order to transmit or receive information in the form of digital or analog data, or for any other purpose. For example, the autonomous ground vehicle 250 may receive instructions or other information or data via the transceiver 256 regarding an item that is to be delivered by the autonomous ground vehicle 250 from the fulfillment center 230 to the customer 240, e.g., from the processor 212, the server 232 and/or the computer 242, or from any other computing device over the network 290. The transceiver 256 may be configured to enable the autonomous ground vehicle 250 to communicate through one or more wired or wireless means, e.g., wired technologies such as Universal Serial Bus (or "USB") or fiber optic cable, or standard wireless protocols such as Bluetooth® or any Wi-Fi protocol, such as over the network 290 or directly. The transceiver 256 may include one or more of the properties or features of the transceiver 216 or the transceiver 236 described herein, or any other properties or features.

As is shown in FIG. 2B, the autonomous ground vehicle 250 also includes one or more control systems 260, as well as one or more sensors 262, one or more power modules 264, one or more navigation modules 266, and one or more user interfaces 268. Additionally, the autonomous ground vehicle 250 further includes one or more motors 270, one or more steering systems 272, one or more item engagement systems (or devices) 274 and one or more illuminators 276 (or other feedback devices).

The autonomous ground vehicle 250 may be any type or form of vehicle. For example, in some embodiments, one or more of the tasks or functions described herein as being performed by an autonomous ground vehicle may be performed by a ground vehicle that is outfitted with one or more of the sensors 262 described herein and is manned or otherwise operated manually, such as a remote-controlled car. Alternatively, the autonomous ground vehicle 250 may be a hovercraft, or any other vehicle or craft configured for travel over land or water surfaces, e.g., at low altitudes.

The control system 260 may include one or more software applications or hardware components configured for controlling or monitoring operations of one or more components such as the sensor 262, the power module 264, the navigation module 266, or the user interfaces 268, as well as the motors 270, the steering systems 272, the item engagement systems 274 and the illuminators 276, e.g., by receiving, generating, storing and/or transmitting one or more computer instructions to such components. The control system 260 may communicate with the marketplace 210, the fulfillment center 230 and/or the customer 240 over the network 290, as indicated by line 258, through the sending and receiving of digital data.

The sensor 262 may be a position sensor such as a GPS receiver in communication with one or more orbiting satellites or other components of a GPS system, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data), of the autonomous ground vehicle 250. Geolocations of the sensor 262 may be associated with the autonomous ground vehicle 250, where appropriate.

The sensor 262 may also be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the autonomous ground vehicle 250, or for any other purpose. For example, the sensor 262 may be configured to capture or detect reflected light if the reflected light is within a field of view of the sensor 262, which is defined as a function of a distance between an imaging sensor and a lens within the sensor 262, viz., a focal length, as well as a position of the sensor 262 and an angular orientation of the lens. Accordingly, where an object appears within a depth of field, or a distance within the field of view where the clarity and focus is sufficiently sharp, the sensor 262 may capture light that is reflected off objects of any kind to a sufficiently high degree of resolution using one or more sensors thereof, and store information regarding the reflected light in one or more data files.

The sensor 262 may also include manual or automatic features for modifying a field of view or orientation. For example, the sensor 262 may be a digital camera configured in a fixed position, or with a fixed focal length (e.g., fixed-focus lenses) or angular orientation. Alternatively, the sensor 262 may include one or more actuated or motorized features for adjusting a position of the sensor 262, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 262, or a change in one or more of the angles defining the angular orientation of the sensor 262.

For example, the sensor 262 may be an imaging device that is hard-mounted to a support or mounting that maintains the imaging device in a fixed configuration or angle with respect to one, two or three axes. Alternatively, however, the sensor 262 may be provided with one or more motors and/or controllers for manually or automatically operating one or more of the components, or for reorienting the axis or direction of the sensor 262, i.e., by panning or tilting the sensor 262. Panning the sensor 262 may cause a rotation within a horizontal plane or about a vertical axis (e.g., a yaw), while tilting the sensor 262 may cause a rotation within a vertical plane or about a horizontal axis (e.g., a pitch). Additionally, the sensor 262 may be rolled, or rotated about its axis of rotation, and within a plane that is perpendicular to the axis of rotation and substantially parallel to a field of view of the sensor 262.

Imaging data (e.g., still or moving images, as well as associated audio data or metadata) captured using the sensor 262 may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, or does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 262 may further be or include one or more compasses, speedometers, altimeters, inclinometers, thermometers, barometers, hygrometers, gyroscopes, air monitoring sensors (e.g., oxygen, ozone, hydrogen, carbon monoxide or carbon dioxide sensors), ozone monitors, pH sensors, moisture sensors, magnetic anomaly detectors, metal detectors, radiation sensors (e.g., Geiger counters, neutron detectors, alpha detectors), accelerometers, ranging sensors (e.g., radar, sonar or LIDAR ranging sensors) or sound sensors (e.g., microphones, piezoelectric sensors, vibration sensors or other transducers for detecting and recording acoustic energy from one or more directions).

The sensor 262 may be further configured to capture, record and/or analyze information or data regarding its positions, velocities, accelerations or orientations of the autonomous ground vehicle 250, and to analyze such data or information by one or more means, e.g., by aggregating or summing such data or information to form one or more qualitative or quantitative metrics of the movement of the sensor 262. For example, a net vector indicative of any and all relevant movements of the autonomous ground vehicle 250, including but not limited to physical positions, velocities, accelerations or orientations of the sensor 262, may be derived. Additionally, coefficients or scalars indicative of the relative movements of the autonomous ground vehicle 250 may also be defined.

Although the sensor 262 is shown as intrinsic to or onboard the autonomous ground vehicle 250, the autonomous ground vehicle 250 may utilize one or more sensors that are external to the autonomous ground vehicle 250 in the capture of information or data, or rely on information or data captured using such sensors, in accordance with the present disclosure. For example, the autonomous ground vehicle 250 may receive information or data regarding ground conditions at a location that was captured by one or more sensors at the location. Such external sensors may have any or all of the features or characteristics of the sensors 262 disclosed herein.

The power module 264 may be any type of power source for providing electrical power, mechanical power or other forms of power in support of one or more electrical or mechanical loads aboard the autonomous ground vehicle 250. In some embodiments, the power module 264 may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 264 may each have any cell voltages, peak load currents, charge times, specific energies, internal resistances or cycle lives, or other power ratings. The power module 264 may also be any type, size or form of other power source, e.g., other than a battery, including but not limited to, one or more fuel cells, turbines, solar cells or nuclear reactors. Alternatively, the power module 264 may be another form of prime mover (e.g., electric, gasoline-powered or any other type of motor) capable of generating sufficient mechanical forces for the autonomous ground vehicle 250.

The navigation module 266 may include one or more software applications or hardware components including or having access to information or data regarding aspects of transportation systems within a given region or space, including the locations, dimensions, capacities, conditions, statuses or other attributes of various paths or routes in the region or space. For example, the navigation module 266 may receive inputs from the sensor 262, e.g., from a GPS receiver, an imaging device or another sensor, and determine an optimal direction and/or an optimal speed of the autonomous ground vehicle 250 for travelling on a given path or route based on such inputs. The navigation module 266 may select a path or route to be traveled upon by the autonomous ground vehicle 250, and may provide information or data regarding the selected path or route to the control system 260.

The user interface 268 may be configured to receive and provide information to human users and may include, but is not limited to, a display, (e.g., a touch-screen display), a scanner, a keypad, a biometric scanner, an audio transducer, one or more speakers, one or more imaging devices such as a video camera, and any other types of input or output devices that may support interaction between the autonomous ground vehicle 250 and a human user. In various embodiments, the user interface 268 may include a variety of different features. For example, in one embodiment, the user interface 268 may include a relatively small display and/or a keypad for receiving inputs from human users. In other embodiments, inputs for controlling the operation of the autonomous ground vehicle 250 may be provided remotely. For example, in order to access a storage compartment, a human user may send a text message to or reply to a text message from the control system 260 and request that a door or other access portal be opened in order to enable the user to access an item therein. In various implementations, the autonomous ground vehicle 250 may have capabilities for directly receiving such signals from a user device or other device (e.g., a device inside a user's residence) that provides a signal to open the storage compartment door.

The motor 270 may be any type or form of motor or engine (e.g., electric, gasoline-powered or any other type of motor) that is capable of providing sufficient rotational forces to one or more axles, shafts and/or wheels for causing the autonomous ground vehicle 250 and any items therein to travel in a desired direction and at a desired speed. In some embodiments, the autonomous ground vehicle 250 may include one or more electric motors having any number of stators, poles and/or windings, such as an outrunner or an inrunner brushless direct current (DC) motor, or any other motors, having any speed rating, power rating or any other rating.

The steering system 272 may be any system for controlling a direction of travel of the autonomous ground vehicle 250. The steering system 272 may include any number of automatically operable gears (e.g., racks and pinions), gear boxes, shafts, shaft assemblies, joints, servos, hydraulic cylinders, linkages or other features for repositioning one or more wheels to cause the autonomous ground vehicle 250 to travel in a desired direction.

The item engagement system 274 may be any mechanical component, e.g., a robotic arm, for engaging an item or for disengaging the item, as desired. For example, when the autonomous ground vehicle 250 is tasked with delivering items or materials from an origin to a destination, the item engagement system 274 may be used to engage the items or materials at the origin and to deposit the items or materials in a cargo bay or other storage compartment prior to departing. After the autonomous ground vehicle 250 arrives at the destination, the item engagement system 274 may be used to retrieve the items or materials within the cargo bay or storage compartment, and deposit the items or materials in a desired location at the destination.

In some embodiments, the autonomous ground vehicle 250 may be programmed or configured to perform one or more missions or tasks in an integrated manner. For example, the control system 260 may be programmed to instruct the autonomous ground vehicle 250 to travel to an origin, e.g., the fulfillment center 230, and to begin the performance of a task there, such as by retrieving an item at the origin using the item engagement system 274, before proceeding to a destination, e.g., the customer 240, along a selected route (e.g., an optimal route). Along the way, the control system 260 may cause the motor 270 to operate at any predetermined speed and cause the steering system 272 to orient the autonomous ground vehicle 250 in a predetermined direction or otherwise as necessary to travel along the selected route, e.g., based on information or data received from or stored in the navigation module 266. The control system 260 may further cause the sensor 262 to capture information or data (including but not limited to imaging data) regarding the autonomous ground vehicle 250 and/or its surroundings along the selected route. The control system 260 or one or more other components of the autonomous ground vehicle 250 may be programmed or configured as necessary in order to execute any actions associated with a given task, in accordance with the present disclosure.

The illuminator 276 may be any light or light source that is configured to project light in one or more directions. For example, in some embodiments, the illuminator 276 may be one or more light-emitting diodes (or "LED"), liquid crystal displays (or "LCD"), incandescent bulbs, compact and/or linear fluorescent bulbs, halogen lamps, metal halide lamps, neon lamps, sodium lamps or any other type or form of lights configured to project light at any frequency, wavelength or intensity. Alternatively, or in addition to the illuminator 276, the autonomous ground vehicle 250 may include one or more other feedback devices, including but not limited to components such as audio speakers or other physical components that may be automatically controlled or configured to generate audible messages, signals or sounds, or one or more haptic vibrating elements that may be automatically controlled or configured to generate tactile vibrations of any frequency or intensity.

Any combination of networks or communications protocols may be utilized in accordance with the systems and methods of the present disclosure. For example, each of the autonomous ground vehicle 250 may be configured to communicate with one another or with the processor 212, the server 232 and/or the computer 242 via the network 290, such as is shown in FIGS. 2A and 2B, e.g., via an open or standard protocol such as Wi-Fi. Alternatively, each of the autonomous ground vehicle 250 may be configured to communicate with one another directly outside of a centralized network, such as the network 290, e.g., by a wireless protocol such as Bluetooth, in which two or more of the autonomous ground vehicle 250 may be paired with one another.

Moreover, in some embodiments, two or more of the autonomous ground vehicles 250 may be configured to collaborate with one another in the performance of one or more tasks. For example, in some embodiments, imaging data captured using sensors 262 provided aboard a first autonomous ground vehicle 250 may be processed to generate a semantic map for use by a second autonomous ground vehicle 250. In some embodiments, the second autonomous ground vehicle 250 may rely upon the semantic map generated by the first autonomous ground vehicle 250 exclusively, or may augment or update the semantic map based on imaging data captured by sensors 262 provided aboard the second autonomous ground vehicle 250, or from any other source. Furthermore, two or more autonomous ground vehicles 250 may collaborate with one another in the performance of one or more tasks, such as by transferring one or more ordered items therebetween, or in any other manner.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by an "online marketplace," a "fulfillment center," a "customer," an "autonomous ground vehicle" (or "autonomous vehicle"), or like terms, may be automated steps performed by their respective computer systems, or implemented within software modules (or computer programs) executed by one or more general-purpose computers. Moreover, process steps described as being performed by an "online marketplace," a "fulfillment center," a "customer," or an "autonomous ground vehicle" may be typically performed by a human operator, but could, alternatively, be performed by an automated agent.

The online marketplace 210, the fulfillment center 230, the customer 240, or the autonomous ground vehicle 250 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the fulfillment center 230 and/or the server 232 may be adapted to transmit information or data in the form of synchronous or asynchronous messages to the online marketplace 210 and/or the processor 212, the customer 240 and/or the computer 242, the autonomous ground vehicle 250 and/or the control system 260, or any other computer device in real time or in near-real time, or in one or more offline processes, via the network 290. Those of ordinary skill in the pertinent art would recognize that the online marketplace 210, the fulfillment center 230, the customer 240, or the autonomous ground vehicle 250 may operate any of a number of computing devices that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 232, the computer 242, the processors 252 or any other computers or control systems utilized by the online marketplace 210, the fulfillment center 230, the customer 240, or the autonomous ground vehicle 250, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/ machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
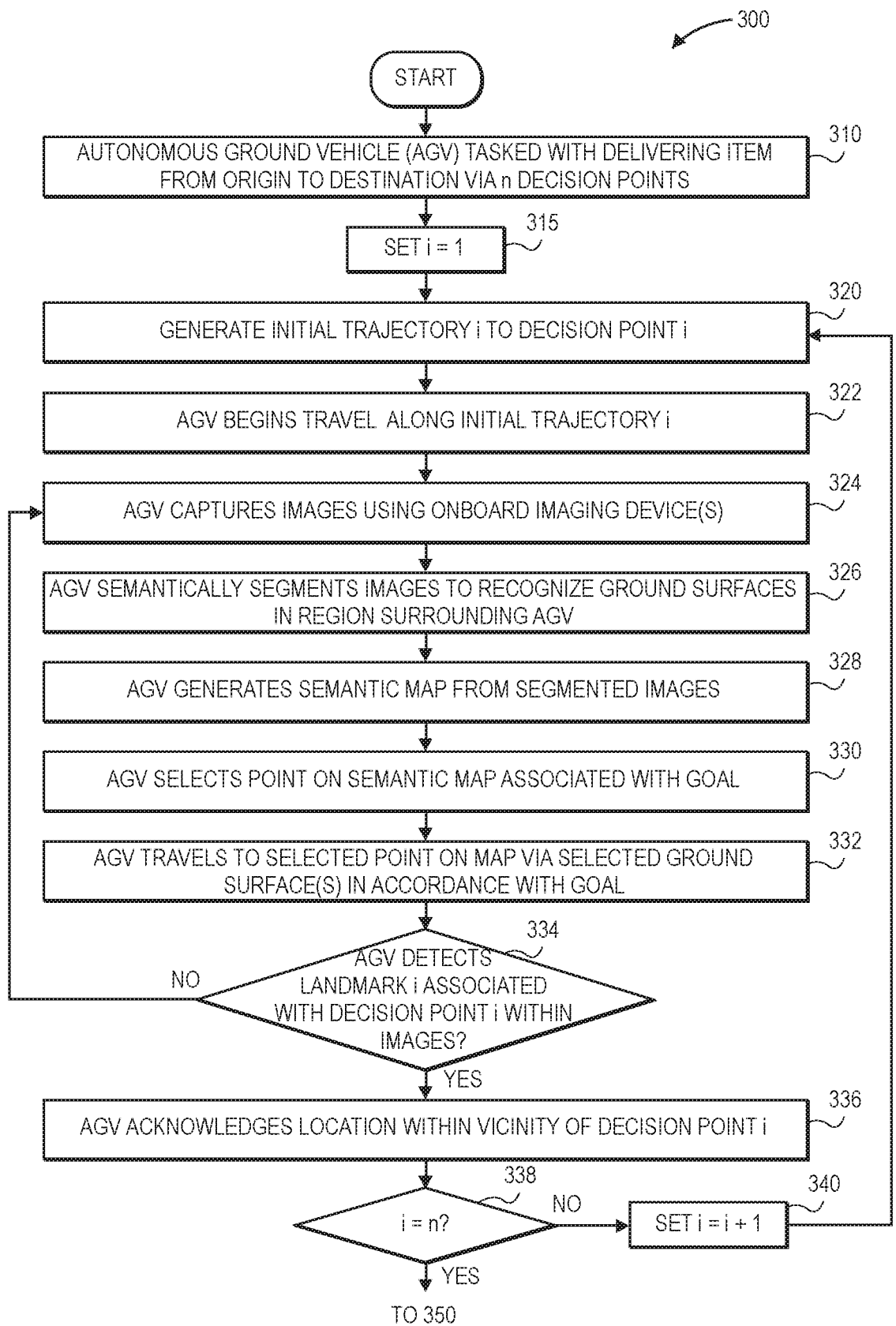
FIGS. 3A and 3B are a flow chart of one process for semantic navigation of autonomous ground vehicles in accordance with embodiments of the present disclosure.
Figure 3B:
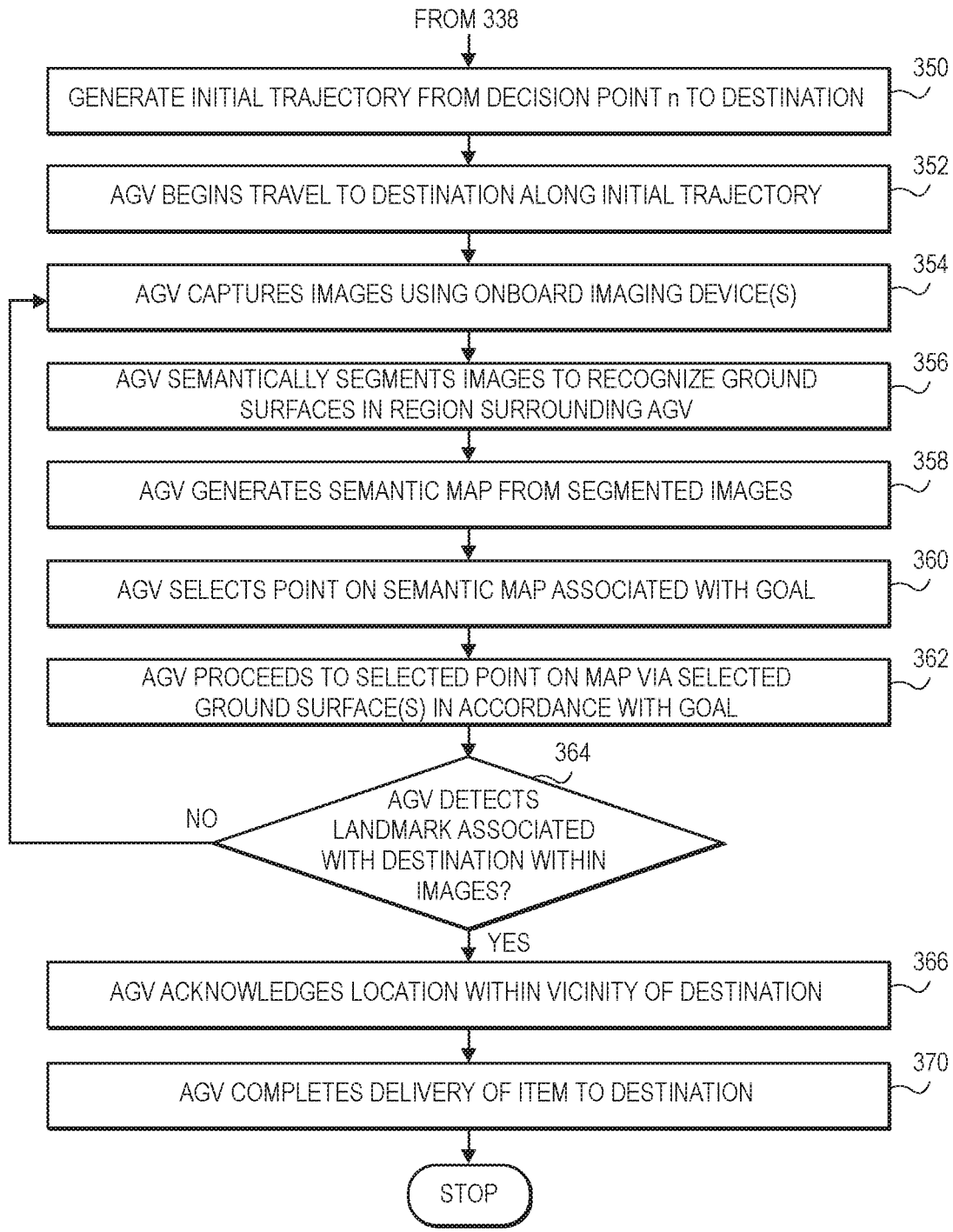

Referring to FIG. 3, a flow chart 300 of one process for semantic navigation of autonomous ground vehicles in accordance with embodiments of the present disclosure is shown. At box 310, an autonomous ground vehicle is tasked with delivering an item from an origin to a destination by way of a plurality of n decision points. For example, the item may have been ordered by a customer from an electronic marketplace, or in person at (or by telephone from) a bricks-and-mortar facility, and the customer may request or specify a destination to which the item is to be delivered. In some embodiments, the item may be loaded into an autonomous ground vehicle at a fulfillment center, a warehouse, a retail establishment, or any other like facility, and the autonomous ground vehicle may be programmed or instructed to travel to the destination. Alternatively, in some embodiments, the item may be loaded onto a carrier vehicle (e.g., a truck, a trailer, a container ship, a cargo ship, an aerial vehicle, or any other vehicle) and transported to a location where the item may be transferred into a cargo bay or other storage compartment of the autonomous ground vehicle. In still other embodiments, the autonomous ground vehicle may be loaded onto such a carrier vehicle, and the item may be transferred into the cargo bay or the other storage compartment within the carrier vehicle. The autonomous ground vehicle may be tasked with delivering the item from the origin to the destination by way of any number of decision points, e.g., locations where the autonomous ground vehicle must execute changes in course or speed in response to prevailing conditions or operational requirements. Alternatively, or additionally, the autonomous ground vehicle may be tasked with delivering the item from the origin to the destination by way of any number of waypoints, e.g., locations through which the autonomous ground vehicle must travel, but for which changes in course or speed are not required.

At box 315, a value of a step variable i is set to equal one, or i=1. At box 320, an initial trajectory i to a decision point i is generated. For example, the initial trajectory i, e.g., a course and a speed, may be generated based on a Great Circle route between a location of the autonomous ground vehicle and the location of the decision point i. The initial trajectory i may also be generated based on an initial semantic map generated by the autonomous ground vehicle, such as is described below with regard to box 324, box 326 and box 328, from which a point may be selected, and a course and a speed for traveling to a location corresponding to the selected point may be determined. Alternatively, the initial trajectory i may be generated based on an initial path of a route, or one or more paths of the route, of a transportation network or infrastructure that may be determined according to one or more optimal path or optimal route algorithms. For example, in some embodiments, the transportation infrastructure may include one or more streets, sidewalks, walkways, driveways or other surfaces within a vicinity of the autonomous ground vehicle, or extending between a location of the autonomous ground vehicle and a location associated with the destination. An initial trajectory i including one or more aspects of the transportation infrastructure may be determined.

At box 322, the autonomous ground vehicle begins to travel along the initial trajectory i. For example, the autonomous ground vehicle may select a course or a speed to enable the autonomous ground vehicle to arrive at a next decision point, e.g., at a decision point i+1, or another location at a selected or desired time, and may depart from the origin or the other location on the course or at the speed. Alternatively, the autonomous ground vehicle may execute any other actions in accordance with one or more sets of instructions for causing the autonomous ground vehicle to travel along the initial trajectory i.

At box 324, the autonomous ground vehicle captures a plurality of images using one or more imaging devices, which may be aligned with fields of view extending forward of the autonomous ground vehicle, such as is shown in FIGS. 1A and 1B, or from port and starboard sides of the autonomous ground vehicle, or any other direction with respect to the autonomous ground vehicle. The imaging devices may be configured to capture color, grayscale or black-and-white images, or any other images (e.g., depth images), in accordance with the present disclosure.

At box 326, the autonomous ground vehicle semantically segments the images to recognize one or more ground surfaces depicted within the images. In some embodiments, the autonomous ground vehicle may be configured to assign labels to one or more pixels depicted within the images. Such labels may correspond to types or categories of ground surfaces (e.g., roads, sidewalks, driveways, lawns, or the like) depicted within such images, or qualities or attributes of such surfaces, including labels corresponding to materials from which such surfaces are formed or comprised (e.g., gravel, pavement, cement, concrete, dirt, grass), or labels corresponding to the ability of autonomous ground vehicles to travel thereon. For example, in some embodiments, the autonomous ground vehicle may provide the images to a segmentation network (e.g., a convolutional neural network or other artificial neural network or machine learning system or tool) that is configured to segment amorphous regions of images which share similar surface colors or textures. The segmentation network may be configured to receive one or more of the images as inputs, and trained to generate outputs that detect, recognize and/or distinguish between surfaces depicted within the images in response to such inputs. In some embodiments, the outputs may be used to identify surfaces that may be traveled upon by the autonomous ground vehicle, such as roads, sidewalks, crosswalks, bicycle paths, walking paths, bridges or trails, as well as surfaces that may not be traveled upon by the autonomous ground vehicle, e.g., surfaces that are wet, dirty, muddy, snowy or otherwise marred, surfaces that are inundated with other vehicles (e.g., high traffic areas), such that the autonomous ground vehicle may not safely transit without an insubstantial risk of collision or other damages, or surfaces where conditions are hazardous to the safe operation of the autonomous ground vehicle.

At box 328, after the images have been semantically segmented, the autonomous ground vehicle generates a sematic map from the segmented images. For example, in some embodiments, a two-dimensional representation of the segments of the images may be generated. The two-dimensional representation may include the labels of each of the pixels within segments of the images, or identifiers associated with such pixels (e.g., specific colors or textures assigned to respective segments or ground surfaces identified as being associated with such segments). The semantic map may have real or scaled dimensions or levels of resolution that are defined or selected on any basis, such as operational properties or capacities of the imaging devices that captured the images, attributes of the autonomous ground vehicle (e.g., actual or intended directions of travel), or the segments of the images themselves. For example, where an image depicts one or more surfaces that are known to be undesirable or impassable for the autonomous ground vehicle, such as highways, buildings or bodies of water, the semantic map need not include extensive sections corresponding to such surfaces, or need not depict such surfaces with high levels of resolution. Alternatively, where an image depicts surfaces that are known to be desirable or passable for the autonomous ground vehicle, such as sidewalks, bike paths, driveways, walkways or other suitable surfaces, the semantic map may depict such surfaces in their entirety, and with high levels of resolution. For example, where a desirable or passable surface passes alongside or near one or more undesirable or impassable surfaces, boundaries or borders between such surfaces may be depicted with substantially high levels of resolution.

In some embodiments, a semantic map generated based on semantically segmented images may have real or scaled dimensions on the order of several meters, such as a square having real or scaled dimensions of fifteen meters by fifteen meters. Alternatively, the semantic maps may have any other dimensions, such as lengths or widths of five meters, ten meters, fifteen meters, twenty meters or more, as well as shapes such as circles, ellipses, rectangles other than squares, cones or sectors, or any other shapes. Additionally, a semantic map may consider or include a location of the autonomous ground vehicle at a geometric center, or in any other location within or outside of the semantic map.

At box 330, the autonomous ground vehicle selects a point on the semantic map that is associated with a goal for the autonomous ground vehicle. For example, where a goal of the autonomous ground vehicle is to travel to a destination, a point selected on the semantic map may include a desired or passable surface for the autonomous ground vehicle that is along the initial trajectory i, or is near, alongside, parallel to or otherwise consistent with the initial trajectory i. Alternatively, in some embodiments, a goal of the autonomous ground vehicle may be to avoid one or more surfaces recognized within the one or more images, or represented in the semantic map. Likewise, in some embodiments, a goal of the autonomous ground vehicle may be to avoid one or more obstructions that are recognized within the one or more images or represented in the semantic map. One or more points may be selected on the semantic map with a goal of avoiding the one or more surfaces or obstructions.

At box 332, the autonomous ground vehicle travels to the selected point on the semantic map via one or more selected ground surfaces in accordance with the goal. For example, upon selecting the point at box 330, the autonomous ground vehicle may calculate or otherwise determine a course or a speed for traveling from a current location to a location associated with the point on the semantic map. The course and/or the speed may be selected on any basis, including but not limited to power available to the autonomous ground vehicle, operational capacities or constraints of the autonomous ground vehicle, topography of a region corresponding to the semantic map, prevailing weather or surface conditions within the region, a time at which the autonomous ground vehicle is expected or desired at the decision point i or the destination, or any other relevant factor.

At box 334, the autonomous ground vehicle determines whether a landmark i is detected within one or more images captured by the autonomous ground vehicle. For example, the autonomous ground vehicle may be programmed or configured to process the images according to one or more object detection or recognition algorithms, and to determine whether or not an object associated with the landmark i or the decision point i is detected therein. In some embodiments, the autonomous ground vehicle may be programmed or configured to search for and detect or recognize a general type or form of landmark, e.g., a fire hydrant, a street sign, a mailbox, an automobile, or any other object. Alternatively, in some other embodiments, the autonomous ground vehicle may be configured to search for and detect or recognize a specific landmark, e.g., a street sign having specific words or symbols thereon, a specific building such a home, an office or another structure, a specific automobile, or any other specific object.

If the autonomous ground vehicle did not detect the landmark i within the images, then the process returns to box 324, where the autonomous ground vehicle continues to capture images using the one or more imaging devices, before proceeding to box 326, where the autonomous ground vehicle semantically segments the images to recognize one or more ground surfaces depicted within the images, and to box 328, where the semantic map is updated, or where a new semantic map is generated, based on the segmented images. In some embodiments, the semantic map may be updated, or a new semantic map may be generated, based on every image captured by the one or more imaging devices aboard the autonomous ground vehicle. In some other embodiments, however, the semantic map may be updated, or a new semantic map may be generated, at regular intervals of time, e.g., once every second or fraction of a second, or after a regular number of images have been captured, e.g., once every ten images, fifteen images, or twenty images.

If the autonomous ground vehicle detects the landmark i associated with the decision point i, then the process advances to box 336, where the autonomous ground vehicle acknowledges that it is located within a vicinity of the decision point i, based on the detection of the landmark i within images captured by the one or more imaging devices.

At box 338, whether the value of the step variable i equals n, viz., the number of decision points, such that the autonomous ground vehicle has arrived at the final decision point. If the value of the step variable i does not equal n, then the process advances to box 340, where the value of the step variable i is incremented by one, or where i is set to equal i+1, before returning to box 320, where an initial trajectory i to a next decision point i is generated on any basis, and to box 322, where the autonomous ground vehicle begins to travel along the initial trajectory i.

If the value of the step variable i equals n, such that the autonomous ground vehicle has arrived at the final decision point, then the process advances to box 350, where an initial trajectory is generated from the decision point n to the destination for the autonomous ground vehicle, and to box 352, where the autonomous ground vehicle begins to travel to the destination along the initial trajectory. As is discussed above, the autonomous ground vehicle may be programmed or configured to select a course and a speed based on any relevant considerations, including but not limited to available power, operational capacities or constraints, topography, prevailing weather or surface conditions, estimated or calculated times of arrival, or any other relevant factor, including but not limited to locations of the final decision point or the destination, or one or more semantic maps.

At box 354, the autonomous ground vehicle captures images using the one or more onboard imaging devices, and at box 356, the autonomous ground vehicle semantically segments the images to recognize one or more ground surfaces in a region surrounding the autonomous ground vehicle. As is discussed above, the ground surfaces may be detected or recognized and segmented in any manner. At box 358, the autonomous ground vehicle generates a semantic map from the segmented images.

At box 360, the autonomous ground vehicle selects a point on the map associated with a goal. For example, the point may be associated with the initial trajectory generated at box 350, or along another trajectory that is near, alongside, parallel to or otherwise consistent with the initial trajectory. At box 362, the autonomous ground vehicle proceeds to the selected point on the map via one or more selected surfaces in accordance with the goal, e.g., at a course and on a speed that may be selected based on any relevant considerations.

At box 364, whether the autonomous ground vehicle has detected a landmark associated with the destination, e.g., a general landmark or a specific landmark associated with the destination, within one or more of the images captured by the autonomous ground vehicle is determined. The landmark may be one or more objects that may identify the destination, e.g., a sign having one or more letters or other symbols, a façade, or another feature of the destination, or any other object.

If the autonomous ground vehicle has not detected the landmark associated with the destination, then the process returns to box 354, where the autonomous ground vehicle captures images using the one or more onboard imaging devices, and to box 356, where the autonomous ground vehicle semantically segments the images to recognize one or more ground surfaces in a region surrounding the autonomous ground vehicle, before proceeding to box 358, where the autonomous ground vehicle generates a semantic map from the segmented images. As is discussed above, the semantic map may be updated, or a new semantic map may be generated, based on every image captured by the one or more imaging devices aboard the autonomous ground vehicle, at regular intervals of time, or after a regular number of images have been captured.

If the autonomous ground vehicle detects the landmark associated with the destination, however, then the process advances to box 366, where the autonomous ground vehicle acknowledges that it is located within a vicinity of the destination, based on the detection of the landmark associated with the destination within images captured by the one or more imaging devices. At box 370, the autonomous ground vehicle completes the delivery of the item to the destination, and the process ends. The autonomous ground vehicle may then be released to perform further tasking, which may but need not involve a delivery of one or more other items. For example, the autonomous ground vehicle may be instructed to proceed to another destination along one or more paths or routes, which may be selected based on a semantic map, based on geolocations of the autonomous ground vehicle or the other destination, or on any other basis.

Figure 4:
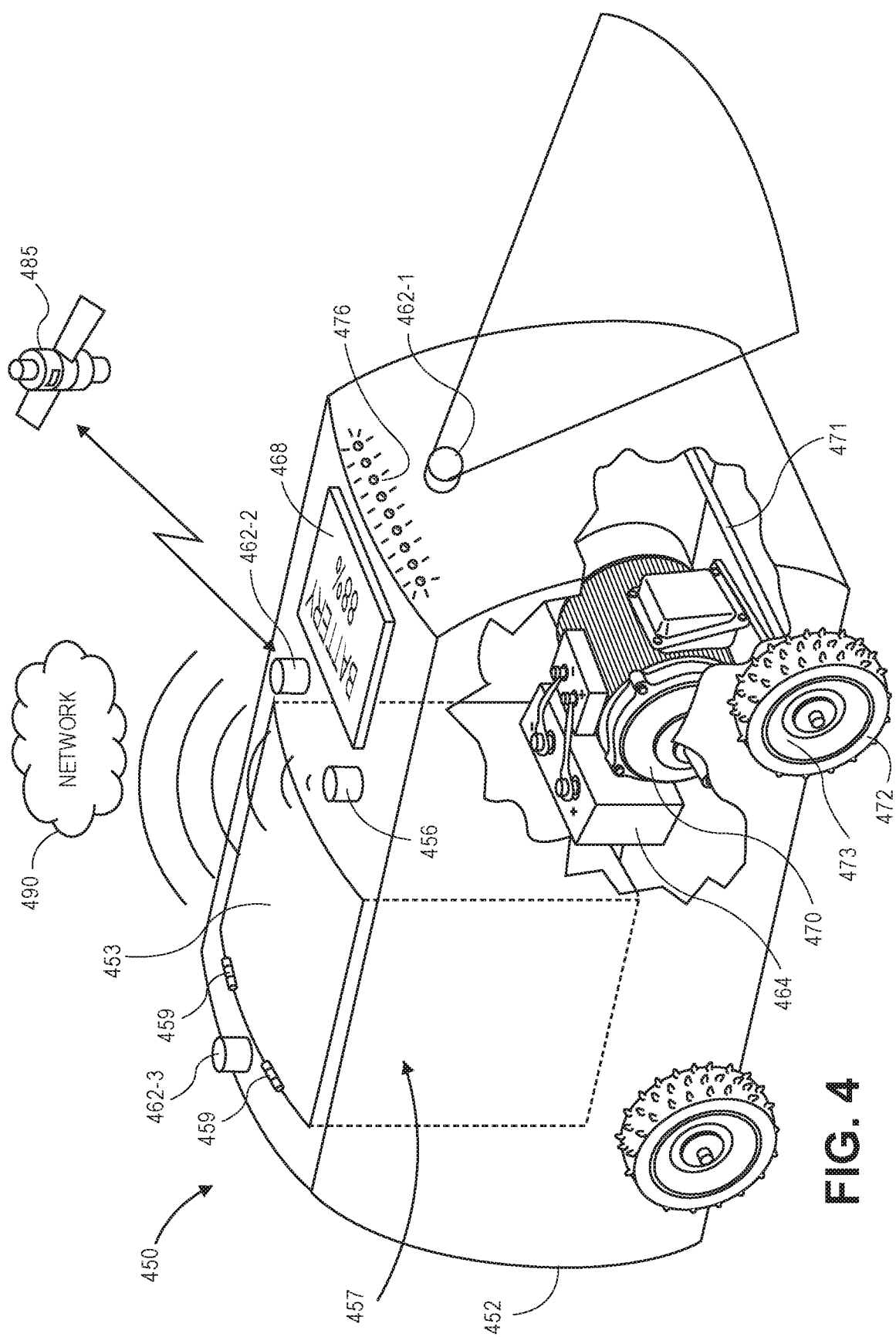
FIG. 4 is a view of one autonomous ground vehicle configured for semantic navigation in accordance with embodiments of the present disclosure.

Referring to FIG. 4, a view of one autonomous ground vehicle configured for semantic navigation in accordance with embodiments of the present disclosure is shown. Except where otherwise noted, reference numerals preceded by the number "4" in FIG. 4 refer to elements that are similar to elements having reference numerals preceded by the number "2" in FIG. 2A or FIG. 2B or by the number "1" shown in FIGS. 1A through 1F.

As is shown in FIG. 4, the autonomous ground vehicle 450 includes a frame 452, a storage compartment 457, a pair of axles 471 and a plurality of wheels 473 joined to the axles 471. A front surface of the frame 452 includes an imaging device 462-1 having a field of view aligned in a forward direction or orientation with respect to the autonomous ground vehicle 450 and an array of lights 476. In some embodiments, the autonomous ground vehicle 450 may include any number of imaging devices 462-1, with fields of view that may be permanently or adjustably aligned in any direction or orientation with respect to the autonomous ground vehicle 450, e.g., forward or aft of the autonomous ground vehicle 450, to port or starboard sides of the autonomous ground vehicle 450, or in any other directions or orientations. For example, in some embodiments, the autonomous ground vehicle 450 may be outfitted with a plurality of imaging devices 462-1 that are aligned in a line, a series or an array, and fields of view of the imaging devices 462-1 may collectively cover substantial portions of a perimeter surrounding the autonomous ground vehicle 450, e.g., one hundred eighty degrees (180°), two hundred ten degrees (210°), two hundred seventy degrees (270°), or three hundred sixty degrees (360°), of the perimeter surrounding the autonomous ground vehicle 450. The imaging devices 462-1 may be configured for ranging operations, e.g., where two or more of the imaging devices 462-1 are operated as parts of stereo pairs, or where one or more of the imaging devices 462-1 are configured to determine ranges based on monocular cues detected within imaging data captured thereby. In some embodiments, the autonomous ground vehicle 450 may include any number of lights 476, on any surface thereof, and one or more of the lights 476 may include one or more LEDs, bulbs or other light sources. Alternatively, the autonomous ground vehicle 450 may include one or more other feedback devices, e.g., audible or haptic feedback devices.

An upper surface of the frame 452 includes a door 453 providing access to the storage compartment 457 and is rotatably connected by a pair of hinges 459. The door 453 may include any number of manual or automatic features for causing the opening or closing thereof, and may include any suitable dimensions with respect to the dimensions of the storage compartment 457. In some embodiments, the autonomous ground vehicle 450 may include doors 453 on any surface thereof, and any number of storage compartments 457 of any size or shape. The upper surface of the frame 452 further includes a transceiver 456, as well as a GPS receiver 462-2, which may receive geolocation data from or transmit geolocation data to a GPS network 485. In some embodiments, the transceiver 456 may include a Wi-Fi transmitter and/or receiver for communicating with a network 490, which may include the Internet in whole or in part, as well as any other transmitters and/or receivers for communicating in any other manner or fashion, or according to any other protocols. In some embodiments, the transceiver 456 may be configured to transmit and/or receive one or more codes or other information or data in one or more radio frequency (or "RF") waves or signals, at any frequencies or power levels. In some embodiments, the transceiver 456 may be configured to transmit and/or receive radio frequency identification (or "RFID") signals, near-field communication (or "NFC") signals, Bluetooth® signals, or any other type of wireless signals.

Additionally, the upper surface of the frame 452 further includes an inclinometer 462-3, which may be configured to determine angles of slope, elevation or depression of the autonomous ground vehicle 450 about one, two or three principal axes, e.g., a roll axis (or x-axis), a pitch axis (or y-axis) or a yaw axis (or z-axis) of the autonomous ground vehicle 450. The upper surface of the frame 452 also includes a user interface 468 which may receive manual interactions from a human user, or display information to the human user, as appropriate. For example, the user interface 468 may be a touchscreen display. In some embodiments, the transceiver 456, the GPS receiver 462-2, the inclinometer 462-3 and/or the user interface 468 may be provided on any other surface of the frame 452.

As is shown in FIG. 4, the autonomous ground vehicle 450 may include a power module 464 (e.g., a battery), a motor 470 (e.g., a DC electric motor operating at twelve to forty-eight volts) and a steering component 472 (e.g., one or more racks or pinions for automatically changing a direction of travel of the autonomous ground vehicle 450 and/or an orientation of one or more of the axles 471 or the wheels 473. The motor 470 may be configured to operate at any speed or have any power rating, and to cause the autonomous ground vehicle 450 to travel in a forward direction of travel, a reverse direction of travel or in any other direction of travel as determined by the steering component 472. Additionally, the axles 471 and wheels 473 of the autonomous ground vehicle 450 may also have any dimensions. For example, the wheels 473 may have bores or axle pads for accommodating axles 471 of any diameter or thickness, and any number of spokes or other extensions for supporting a rim having any desired spacings or offsets for accommodating tires or other coverings. Each of the axles 471 may be joined to and configured to rotate any number of wheels 473, which may include tires or other coverings of any suitable material, including but not limited to rubbers and/or plastics. The wheels 473 or tires thereon may feature any number of belts, walls, treads or other components, and may be pneumatic or solid, or take any other form. In some embodiments, the wheels 473 may be omnidirectional wheels.

According to some embodiments, autonomous ground vehicles of the present disclosure, such as the autonomous ground vehicle 450 of FIG. 4, may be configured for travel throughout an area or environment, such as travel on traditional transportation and non-traditional transportation infrastructure provided within the area or environment. The autonomous ground vehicle 450 may select a path or route based on geospatial data regarding physical features in an area or environment, including but not limited to topographical data regarding the composition and surface features within the area or environment, as well as elevations of points within the area or environment, which may be identified or determined from satellite or ground-based imagery, GIS data, or any other information or data obtained from any other source. Similarly, where an area or environment includes transportation infrastructure such as roads, sidewalks, crosswalks, bicycle or walking paths, bridges or trails, and also non-traditional transportation infrastructure, e.g., parks, fields, forests, lots, clearings or other spaces, the autonomous ground vehicle 450 may be configured for travel thereon along one or more paths or routes, which may be selected or defined based on attributes of the transportation infrastructure and other physical features within the area or environment, as well as attributes of prior travel through the area or environment. Information or data regarding prior travel that may be used to select or define a path or route within an area or environment includes, but is not limited to, one or more time stamps (e.g., times and positions of autonomous ground vehicles within the given area at such times), elapsed times between departures and arrivals, net speeds, courses, angles of orientation (e.g., a yaw, a pitch or a roll), levels of traffic congestion, sizes or dimensions of any payloads carried, environmental conditions or any other information or data that describes or represents instances of prior travel by autonomous ground vehicles within the area or environment.

As is discussed above, autonomous ground vehicles may be configured to generate semantic maps using images captured by one or more onboard imaging devices during operation. Referring to FIGS. 5A through 5D, views of aspects of one system for semantic navigation of autonomous ground vehicles in accordance with embodiments of the present disclosure are shown. Except where otherwise noted, reference numerals preceded by the number "5" in FIGS. 5A through 5D refer to elements that are similar to elements having reference numerals preceded by the number "4" in FIG. 4, by the number "2" in FIG. 2A or FIG. 2B or by the number "1" shown in FIGS. 1A through 1F.

Figure 5A:
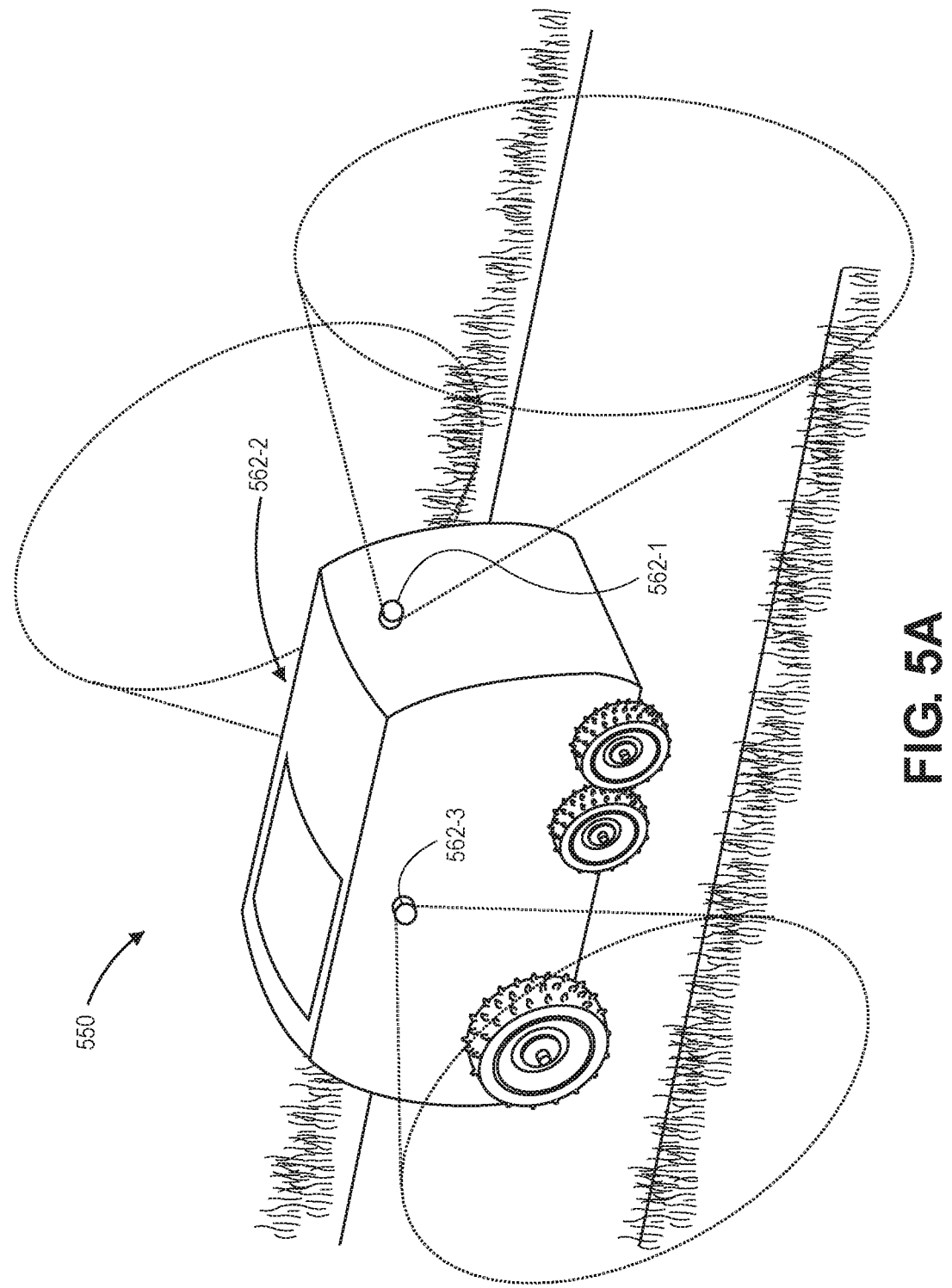
FIGS. 5A through 5D are views of aspects of one system for semantic navigation of autonomous ground vehicles in accordance with embodiments of the present disclosure.

As is shown in FIG. 5A, an autonomous ground vehicle 550 includes a plurality of imaging devices 562-1, 562-2, 562-3 having fields of view that are aligned forward of, and to port and starboard sides of, respectively, the autonomous ground vehicle 550. As is shown in FIG. 5A, the autonomous ground vehicle 550 travels along a sidewalk or other like passageway during the performance of one or more tasks or missions, on a course and at a speed that may be selected on any basis or factor.

Figure 5B:
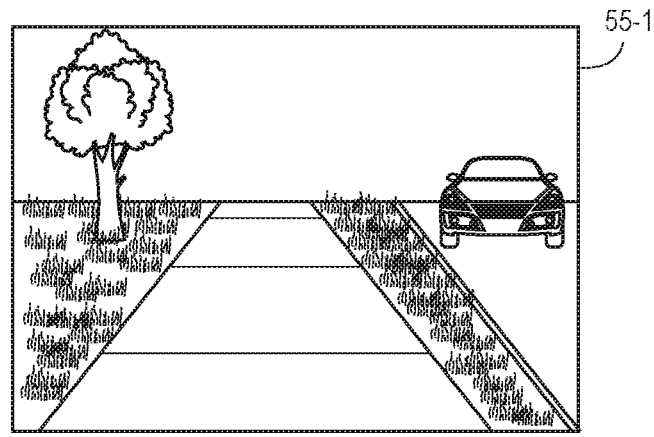
Figure 5B:
Figure 5B:
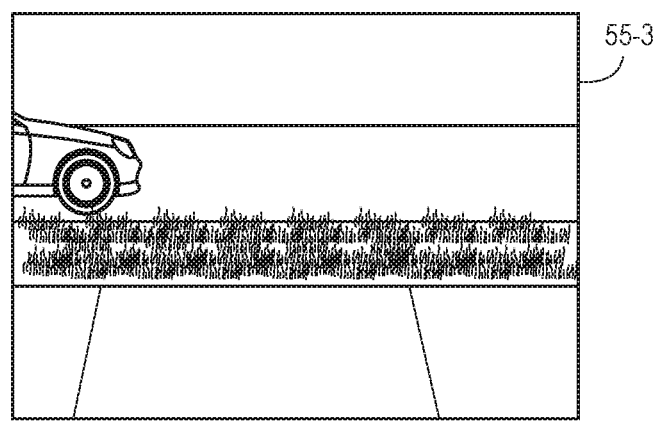

As is shown in FIG. 5B, an image 55-1 captured by the imaging device 562-1 having a field of view oriented forward of the autonomous ground vehicle 550 depicts the sidewalk upon which the autonomous ground vehicle 550 travels, as well as grass or other natural surfaces on either side of the sidewalk, and a roadway adjacent the sidewalk having automobile or other vehicular traffic traveling thereon. As is also shown in FIG. 5B, an image 55-2 captured by the imaging device 562-2 having a field of view oriented on a port side of the autonomous ground vehicle 550 depicts a dwelling or other structure left of the autonomous ground vehicle 550, along with portions of the sidewalk upon which the autonomous ground vehicle 550 travels and grass or other natural surfaces left of the sidewalk. As is further shown in FIG. 5B, an image 55-3 captured by the imaging device 562-3 having a field of view oriented on a starboard side of the autonomous ground vehicle 550 depicts the roadway adjacent the sidewalk and the automobile or other vehicular traffic traveling thereon, as well as grass or other natural surfaces between the sidewalk and the roadway.

Figure 5C:
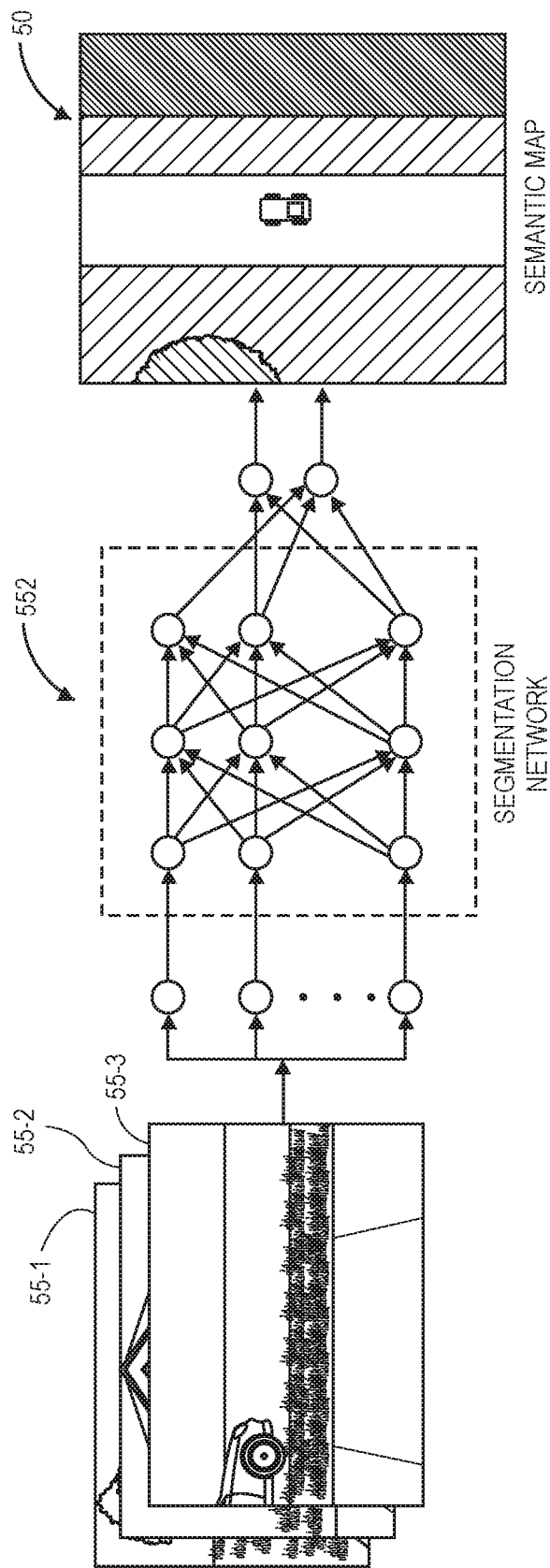

Images captured using imaging devices provided aboard autonomous ground vehicles may be semantically segmented in any manner, and semantic maps may be generated based on the semantically segmented images in any manner. For example, as is shown in FIG. 5C, the images 55-1, 55-2, 55-3 may be provided as inputs to a segmentation network or one or more other machine learning systems or techniques operated by one or more computer processors, devices or systems provided aboard the autonomous ground vehicle 550. Information or data regarding surface conditions within a vicinity of the autonomous ground vehicle 550 may be determined based on outputs received from the segmentation network. In some embodiments, the segmentation network or other machine learning system or technique may include one or more artificial neural networks (e.g., convolutional neural networks) that are trained to map pixels of inputted imaging data to desired outputs by adjusting strengths of connections between one or more neurons, which are sometimes called synaptic weights. Such neural networks may have any number of layers, including an input layer, an output layer, and any number of intervening hidden layers. Each of the neurons in a layer within an artificial neural network may receive an input and generate an output in accordance with an activation or energy function, with parameters corresponding to the various strengths or synaptic weights.

In some embodiments, a segmentation network may be a heterogeneous neural network, and each of the neurons within the network may be understood to have different activation or energy functions. The segmentation network may be trained by redefining or adjusting strengths or weights of connections between neurons in the various layers of the network, in order to provide an output that most closely approximates or associates with the input to the maximum practicable extent. In some embodiments, a segmentation network may be characterized as either feedforward neural networks or recurrent neural networks, and may be fully or partially connected. In a feedforward neural network, e.g., a convolutional neural network, information may specifically flow in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

A segmentation network or another machine learning system or technique may be trained in any manner, such as by supervised or unsupervised learning, or by backpropagation, or in any other manner, using images including pixels or sets of pixels depicting known ground surfaces and labels corresponding to each of such ground surfaces. Once a neural network has been trained to recognize dominant characteristics of an input of a training set, e.g., to associate a pixel or set of pixels within an image with a label of a ground surface, one or more images of ground surfaces may be provided to the trained network, and labels of the ground surfaces may be identified based on outputs received from the trained network.

Figure 5D:
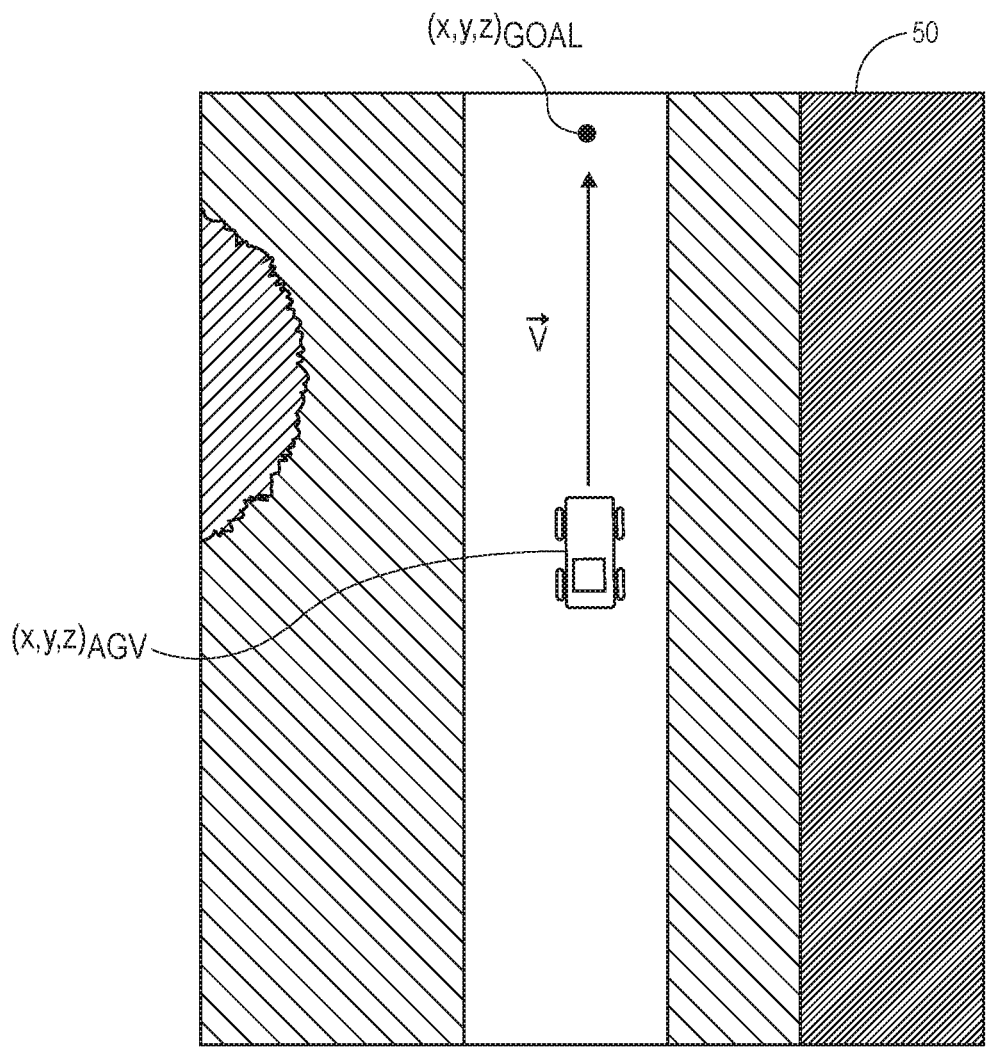

As is shown in FIG. 5D, a semantic map 50 may be generated based on outputs received from the machine learning tool. The semantic map 50 identifies surfaces within a vicinity of the autonomous ground vehicle 550 with one or more express identifiers or labels, such as grass, sidewalk, roadway, or others, and may depict the surfaces with one or more discrete colors or textures accordingly. Additionally, as is also shown in FIG. 5D, the autonomous ground vehicle 550 selects a point $(x, y, z)_{GOAL}$ on the semantic map 50 that is associated with one or more goals for the autonomous ground vehicle 550, and determines a velocity V (e.g., a course and a speed) for travel from a point $(x, y, z)_{AGV}$ corresponding to a location of the autonomous ground vehicle 550 to the point $(x, y, z)_{GOAL}$. For example, such goals may include not only traveling to the location associated with the point $(x, y, z)_{GOAL}$, or to another location, but also safely maintaining a roadway or another surface represented within the semantic map 50 at a sufficient distance from the autonomous ground vehicle 550, or on a selected side of the autonomous ground vehicle 550, or along or near a centerline of a sidewalk or other surface upon which the autonomous ground vehicle 550 travels, e.g., on a line or series of midpoints between boundaries on a left side and a right side of the sidewalk or the other surface depicted within the semantic map 50, or any other goals. While traveling to the location associated with the point (x, y, z)$_{GOAL}$, the autonomous ground vehicle 550 may rely upon the semantic map 50 in selecting or modifying one or more aspects of the velocity V, e.g., to remain on passable or desirable ground surfaces, or to avoid impassable or undesirable ground surfaces, or other obstacles, and continuing to travel in furtherance of one or more goals.

As is discussed above, where an autonomous ground vehicle is instructed to travel from an origin to a destination based on GPS-determined positions, or on any other basis, the autonomous ground vehicle may capture and semantically segment imaging data, and generate semantic maps from the segmented imaging data. The autonomous ground vehicle may then utilize the semantic maps in selecting courses and speeds from the origin to the destination. Referring to FIGS. 6A through 6G, views of aspects of one system for semantic navigation of autonomous ground vehicles in accordance with embodiments of the present disclosure are shown. Except where otherwise noted, reference numerals preceded by the number "6" in FIGS. 6A through 6G refer to elements that are similar to elements having reference numerals preceded by the number "5" in FIGS. 5A through 5D, by the number "4" in FIG. 4, by the number "2" in FIG. 2A or FIG. 2B or by the number "1" shown in FIGS. 1A through 1F.

Figure 6A:
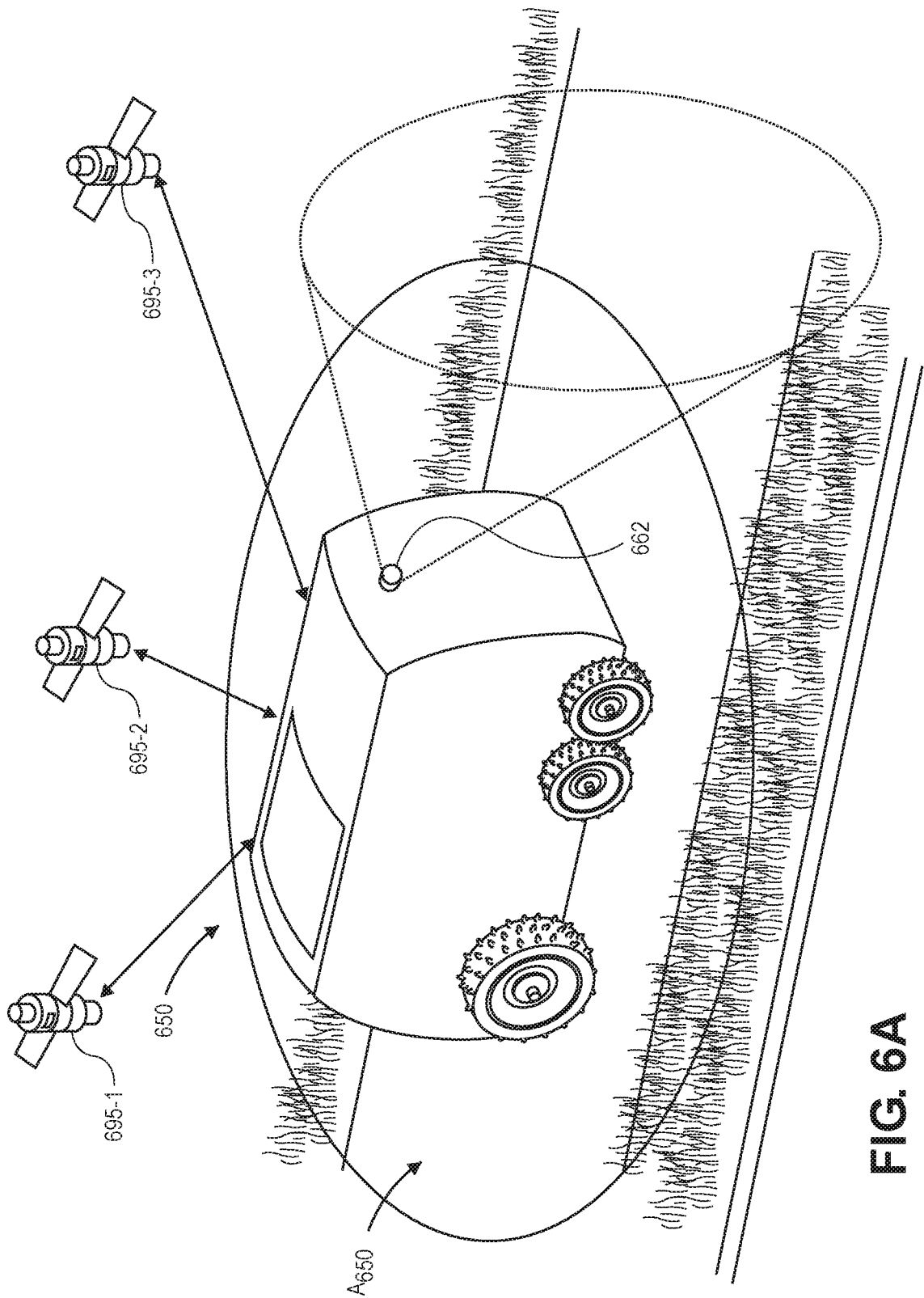
FIGS. 6A through 6G are views of aspects of one system for semantic navigation of autonomous ground vehicles in accordance with embodiments of the present disclosure.

As is shown in FIG. 6A, an autonomous ground vehicle 650 includes an imaging device 662 that is aligned with a field of view extending forward of the autonomous ground vehicle 650. Additionally, the autonomous ground vehicle 650 is further configured to receive position signals from one or more GPS satellites 695-1, 695-2, 695-3, and determine its position, within an area of uncertainty A$_{650}$, based on such signals.

Figure 6B:
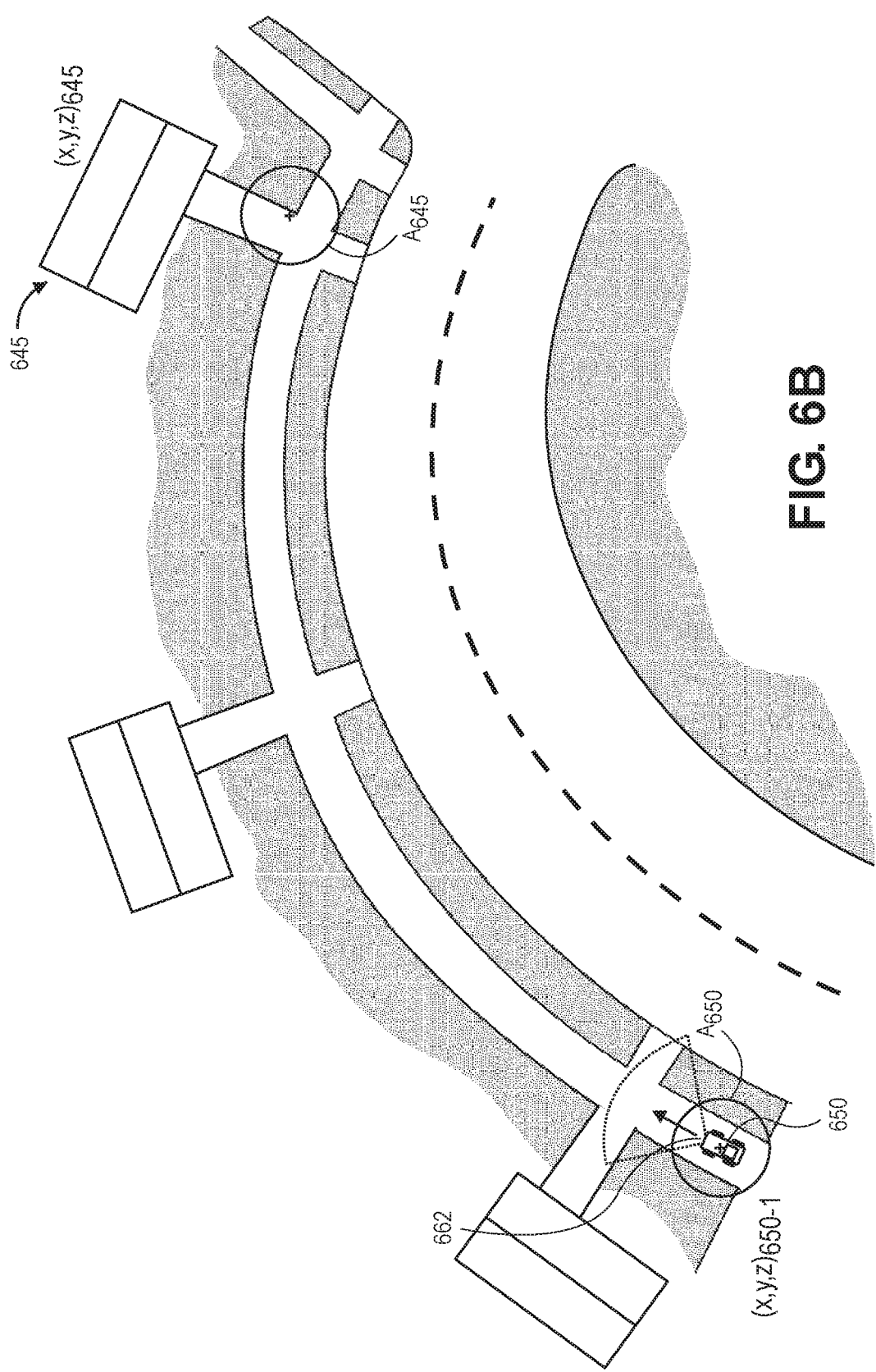

As is shown in FIG. 6B, the autonomous ground vehicle 650 may be instructed to travel from an initial position (x, y, z)$_{650-1}$ to a position (x, y, z)$_{645}$ associated with a destination 645. The position (x, y, z)$_{650-1}$ and the position (x, y, z)$_{645}$ may be determined based on position signals received from one or more GPS satellites, e.g., the GPS satellites 695-1, 695-2, 695-3. Each of the position (x, y, z)$_{650-1}$ and the position (x, y, z)$_{645}$ may be determined subject to an area of uncertainty, viz., the area of uncertainty A$_{650}$ with respect to the position (x, y, z)$_{650-1}$ and an area of uncertainty A$_{645}$ with respect to the position (x, y, z)$_{645}$ of the destination 645, each typically having a radius of approximately eight meters.

Figure 6C:
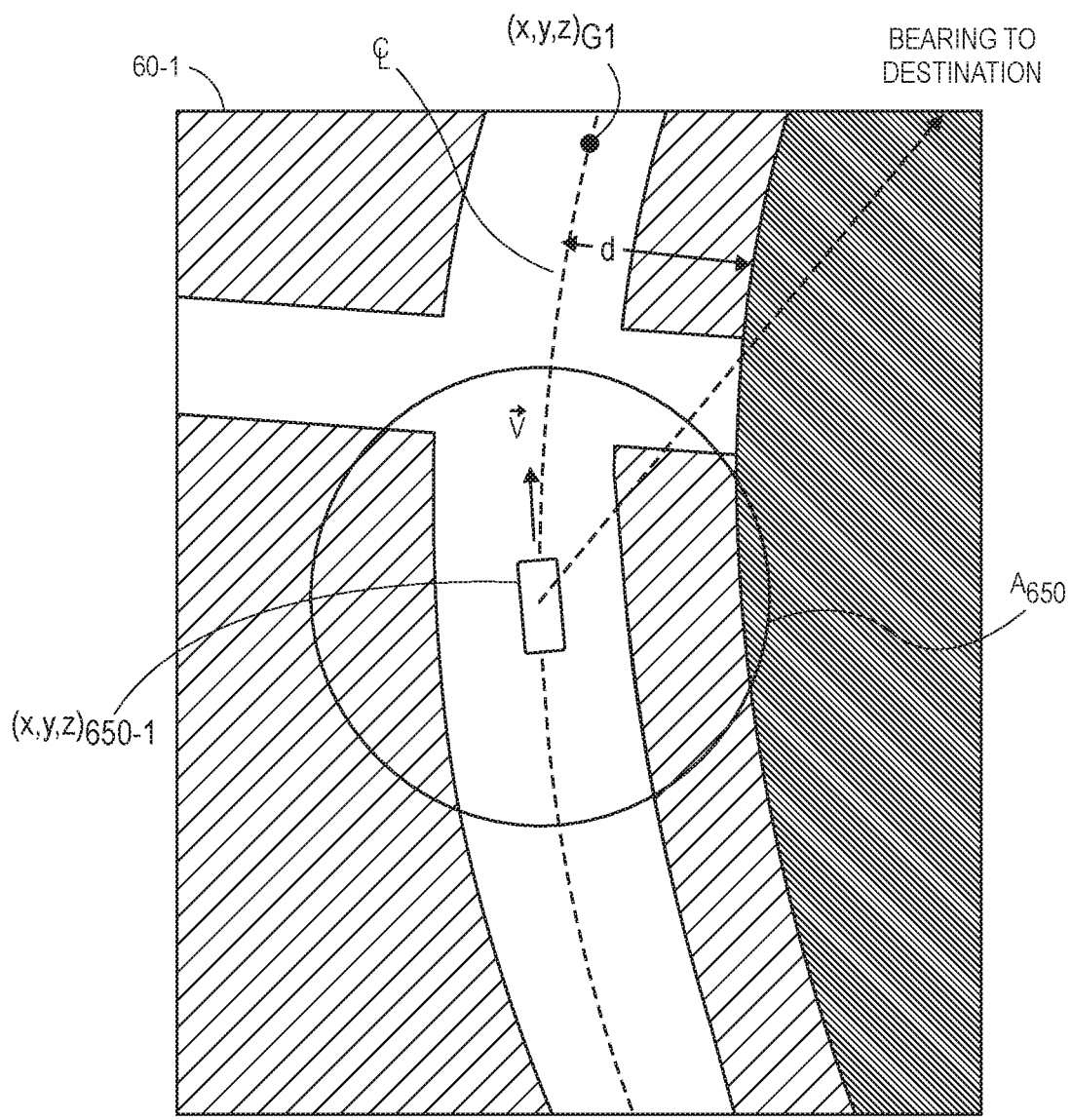

The autonomous ground vehicle 650 may begin to travel on an initial trajectory, e.g., on a course and at a speed selected to reach the destination 645 at a desired time, and capture images using the imaging device 662, or any other imaging devices (not shown), provided aboard the autonomous ground vehicle 650. As is shown in FIG. 6C, the autonomous ground vehicle 650 generates a semantic map 60-1 based on such images, e.g., by providing the images to a segmentation network, or an artificial neural network, such as a convolutional neural network, that is configured to detect, recognize or identify one or more ground surfaces within a vicinity of the autonomous ground vehicle 650 depicted within such images. In some embodiments, the autonomous ground vehicle 650 may semantically segment such images, such as by assigning labels to one or more pixels or sets of pixels depicted within the images to indicate whether such pixels depict certain types or categories of ground surfaces, e.g., not only sidewalks but also roads, driveways, lawns or other surfaces. Alternatively, or additionally, the autonomous ground vehicle 650 may assign labels to such pixels or sets of pixels indicating whether such surfaces are formed from one or more specific materials, or whether one or more of the surfaces are passable or desirable for travel thereon by the autonomous ground vehicle 650, or whether one or more of the surfaces are impassable or undesirable for travel thereon by the autonomous ground vehicle 650.

Once the semantic map 60-1 has been generated, the autonomous ground vehicle 650 may select one or more points on the semantic map 60-1 in accordance with one or more goals for the autonomous ground vehicle 650, and generate or execute one or more sets of instructions for traveling to a location associated with the point in furtherance of the goals. For example, as is shown in FIG. 6C, the autonomous ground vehicle 650 selects a point (x, y, z)$_{G1}$ on the semantic map 60-1 corresponding to a location on a surface of the sidewalk, and determine a velocity V for traveling to the location corresponding to the point (x, y, z)$_{G1}$.

Additionally, the autonomous ground vehicle 650 also selects the velocity V for traveling to the location associated with the point (x, y, z)$_{G1}$ in furtherance of one or more goals. For example, as is shown in FIG. 6C, the autonomous ground vehicle 650 selects courses and speeds with the goals of traveling on a centerline of the sidewalk, e.g., on a line or series of midpoints between boundaries on a left side and a right side of the sidewalk depicted within the semantic map 60-1, or at a predetermined distance or range d from the roadway or other hazardous surface, or to maintain the roadway on a selected side of the autonomous ground vehicle 650, rather than proceeding directly on a bearing to the destination 645. Because an area of the semantic map 60-1 is larger than the area of uncertainty A$_{650}$ associated with the GPS-determined position (x, y, z)$_{650-1}$, the autonomous ground vehicle 650 may select courses and speeds for traveling with greater precision than if the autonomous ground vehicle 650 relied on GPS-determined positions alone.

Figure 6D:
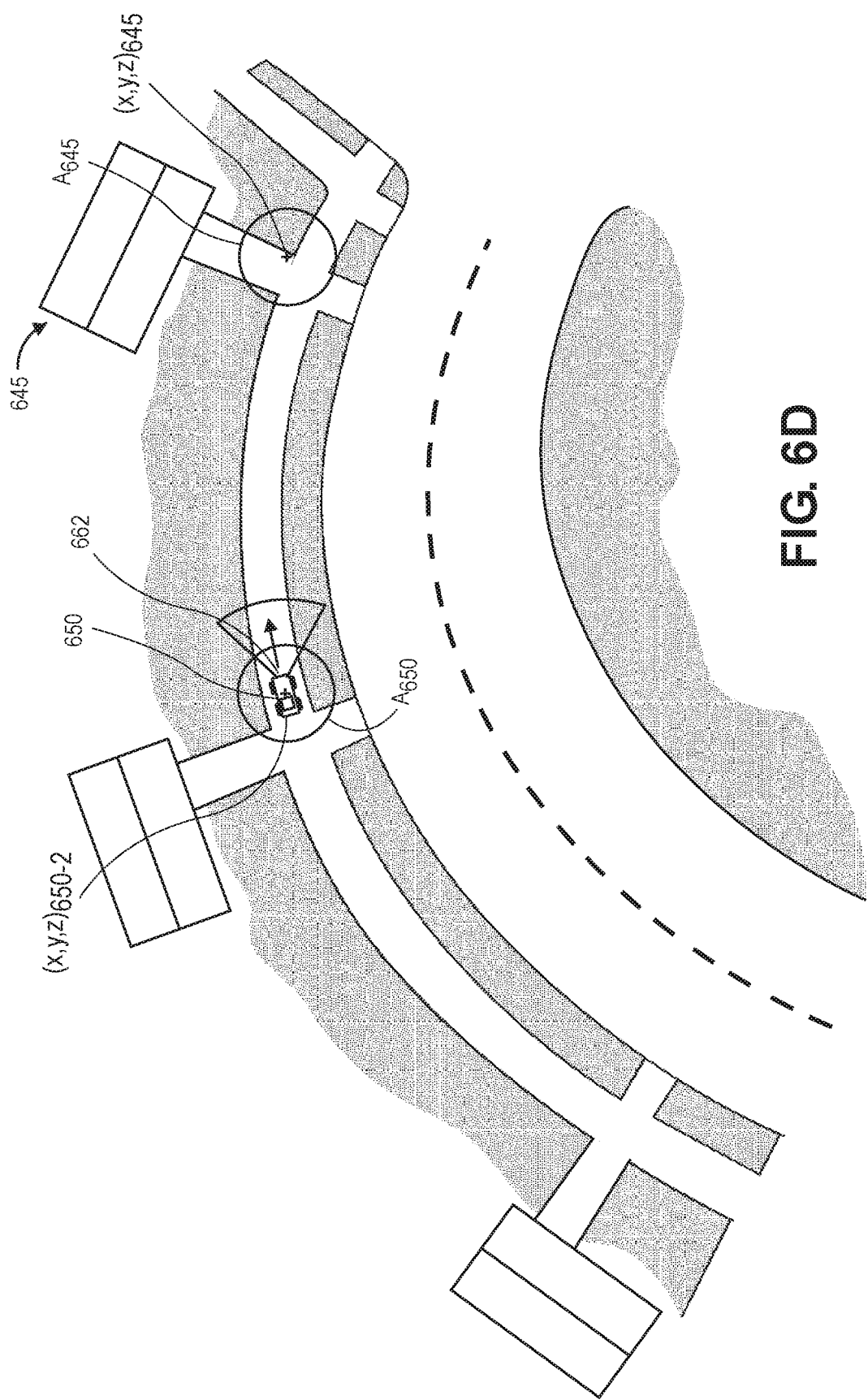
Figure 6E:
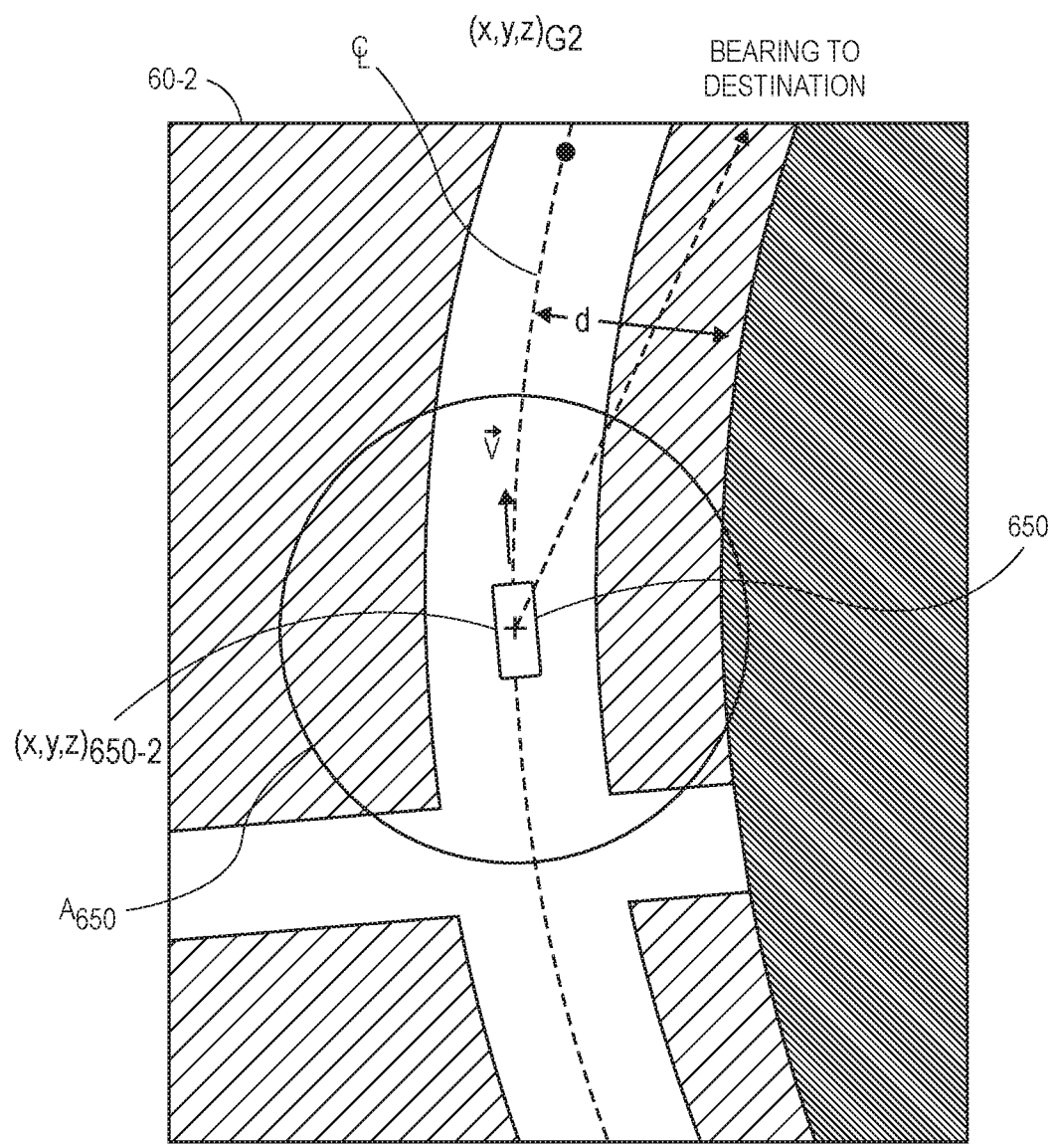

Similarly, as is shown in FIG. 6D, the autonomous ground vehicle 650 captures images using the imaging device 662 at a position (x, y, z)$_{650-2}$ and, as is shown in FIG. 6E, generates a new semantic map 60-2 based on such images. The autonomous ground vehicle 650 selects the point (x, y, z)$_{G2}$ on the semantic map 60-2 corresponding to a location on a surface of the sidewalk, and determines a velocity V for traveling to the location corresponding to the point (x, y, z)$_{G2}$. The autonomous ground vehicle 650 then travels along the sidewalk to the location corresponding to the point (x, y, z)$_{G2}$, while remaining on or near a centerline of the sidewalk, or at the predetermined distance or range d from the roadway or other hazardous surface, or to maintain the roadway on a selected side of the autonomous ground vehicle 650, rather than proceeding directly on a bearing to the destination 645.

Figure 6F:
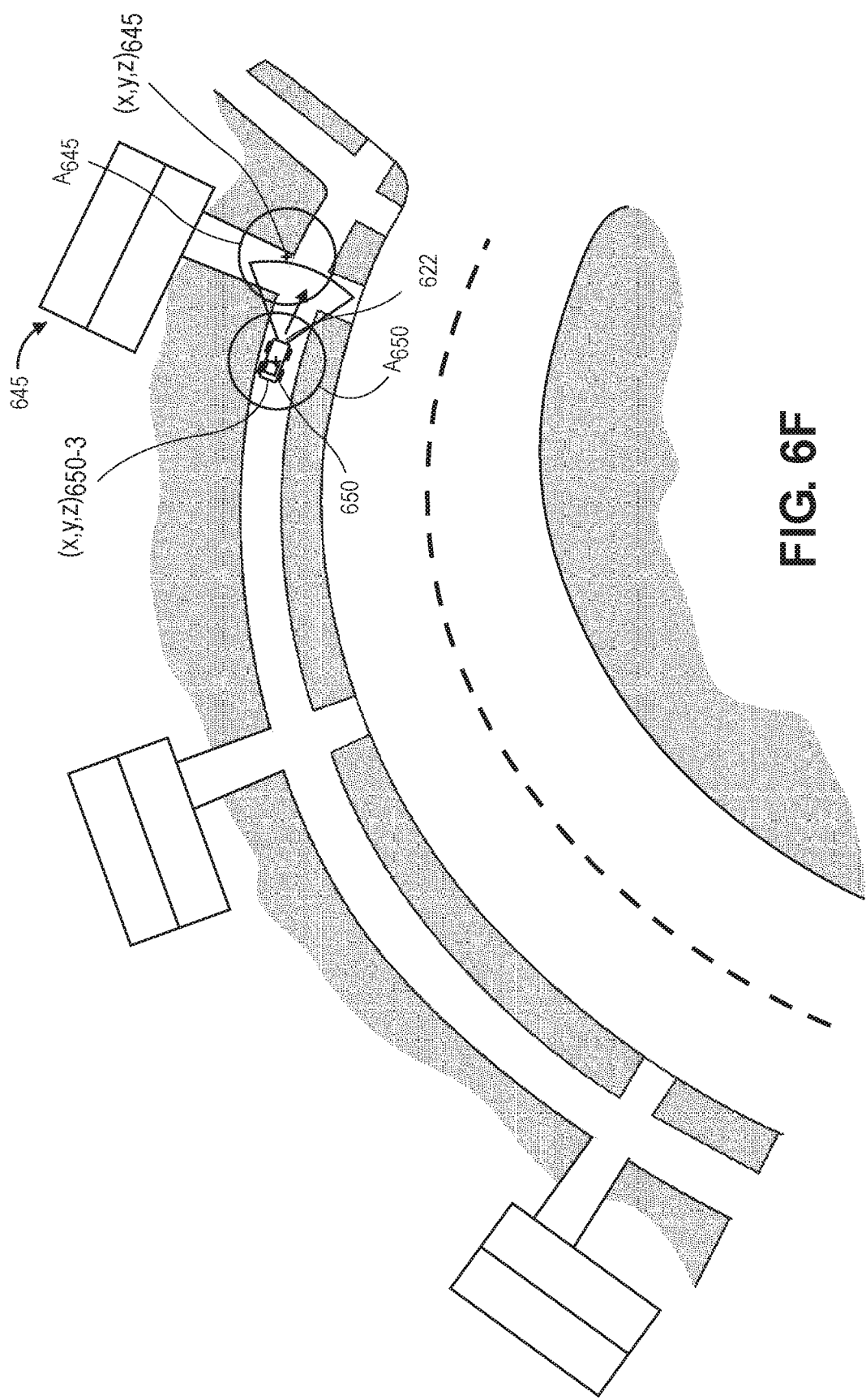
Figure 6G:
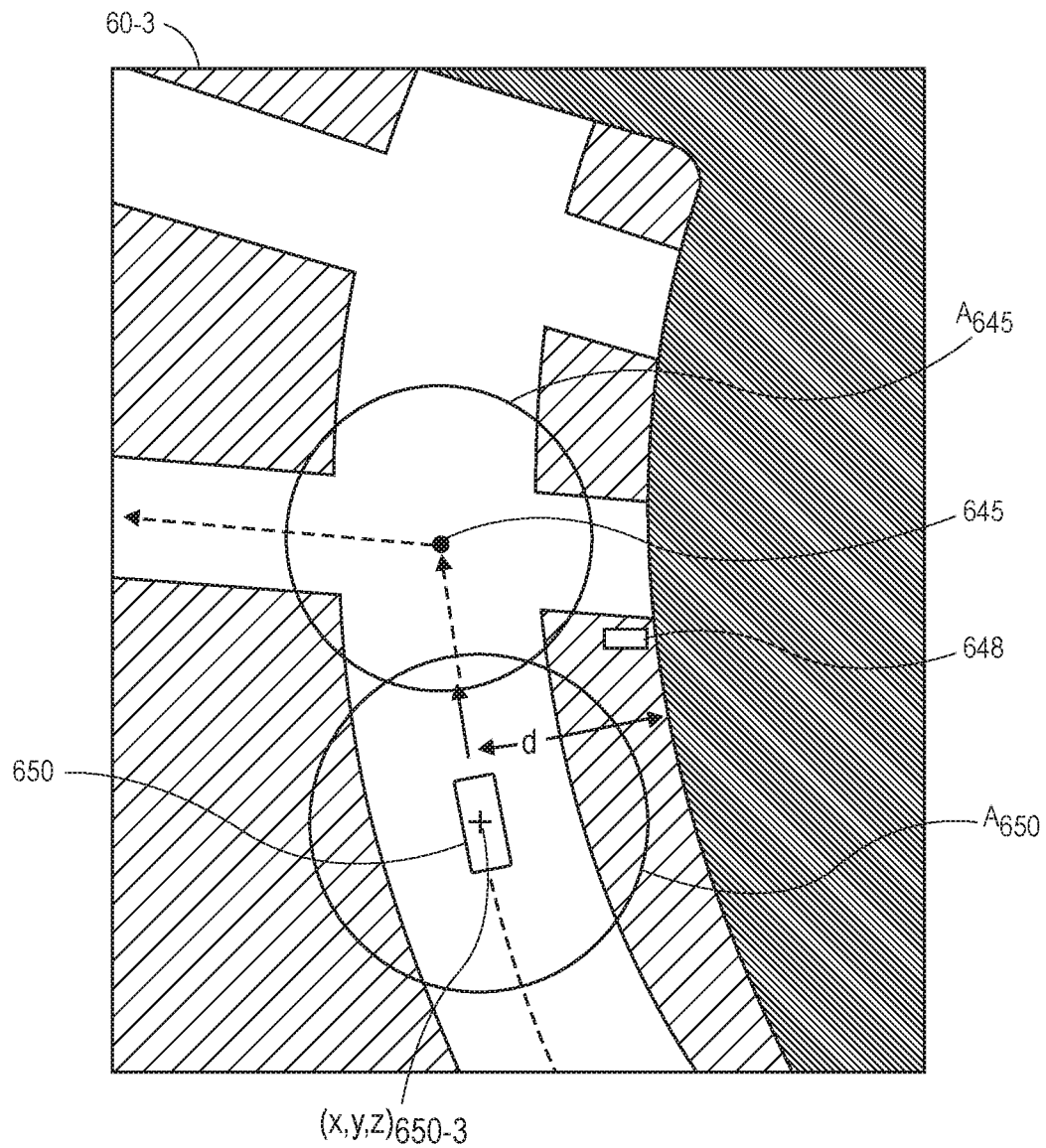

As is shown in FIG. 6F, as the autonomous ground vehicle 650 approaches the destination 645, the autonomous ground vehicle 650 captures images using the imaging device 662 at a position (x, y, z)$_{650-3}$ and, as is shown in FIG. 6G, the autonomous ground vehicle 650 generates a new semantic map 60-3 based on such images. The autonomous ground vehicle 650 then travels along the sidewalk to a location corresponding to the destination 645 while remaining on or near a centerline of the sidewalk, or at the predetermined distance or range d from the roadway or other hazardous surface, or to maintain the roadway on a selected side of the autonomous ground vehicle 650. Upon arriving at the location corresponding to the destination 645, the autonomous ground vehicle 650 executes a turn toward the destination 645, in furtherance of one or more goals, such as to complete a delivery of an item to the destination 645.

As is discussed above, autonomous ground vehicles may be further configured to search for one or more landmarks depicted within imaging data, or represented within semantic maps, and to generate or execute instructions in furtherance of one or more goals, such as changes in courses or speeds. Referring to FIGS. 7A through 7F, views of aspects of one system for semantic navigation of autonomous ground vehicles in accordance with embodiments of the present disclosure are shown. Except where otherwise noted, reference numerals preceded by the number "7" in FIGS. 7A through 7F refer to elements that are similar to elements having reference numerals preceded by the number "6" in FIGS. 6A through 6G, by the number "5" in FIGS. 5A through 5D, by the number "4" in FIG. 4, by the number "2" in FIG. 2A or FIG. 2B or by the number "1" shown in FIGS. 1A through 1F.

Figure 7A:
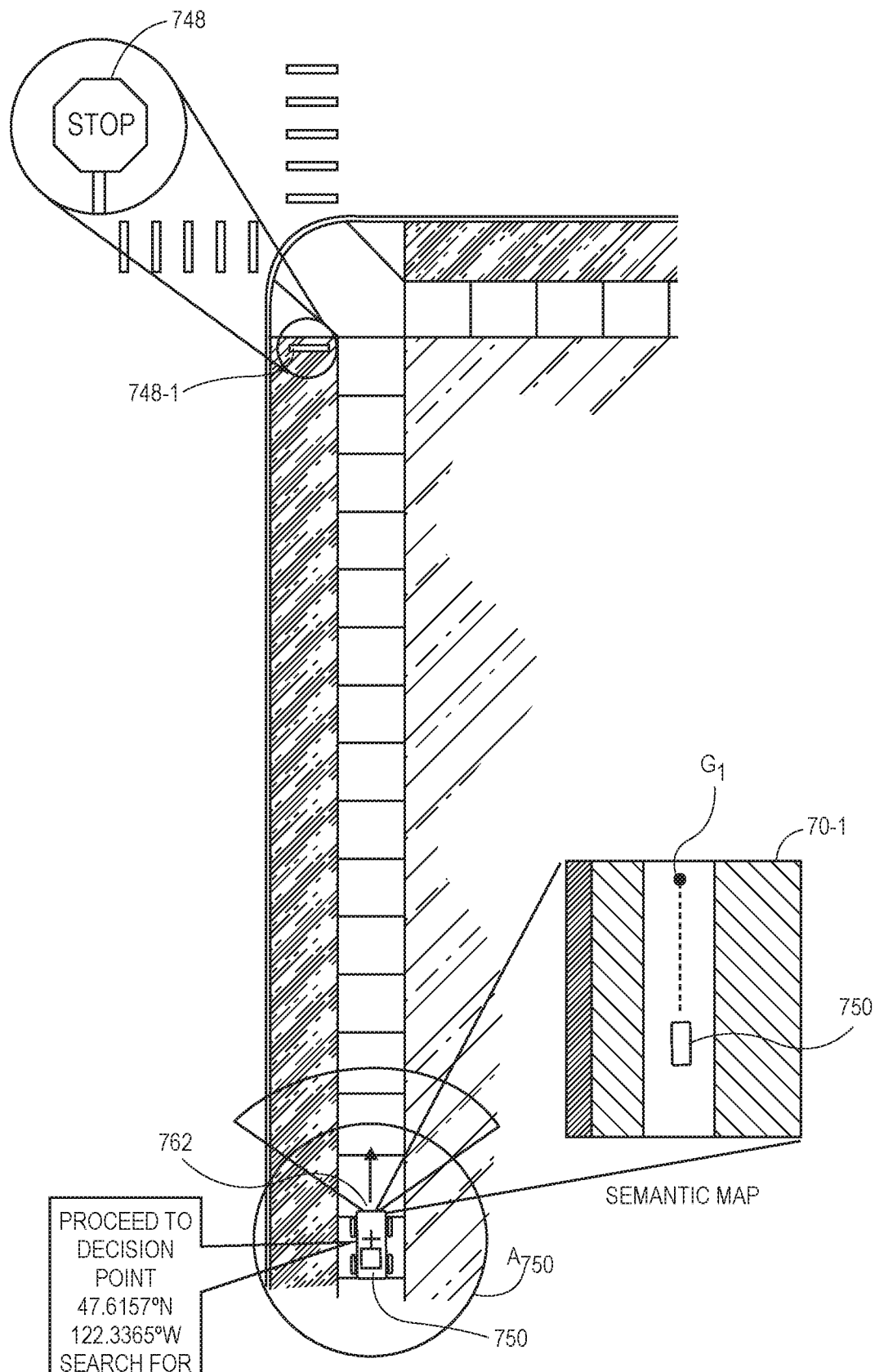
FIGS. 7A through 7F are views of aspects of one system for semantic navigation of autonomous ground vehicles in accordance with embodiments of the present disclosure.

As is shown in FIG. 7A, an autonomous ground vehicle 750 is programmed to travel to a geolocation associated with a landmark 748-1, viz., a stop sign. The autonomous ground vehicle 750 travels on a first sidewalk or like path, and captures images using one or more imaging devices 762. A semantic map 70-1 is generated based on such images, and includes labels of pixels or sets of pixels corresponding to surfaces depicted within such images. Based on the semantic map 70-1, a point $G_1$ on the semantic map 70-1 is selected. The autonomous ground vehicle 750 then selects one or more courses or speeds for remaining on the first sidewalk, and in furtherance of one or more goals, while traveling to a location associated with the point $G_1$.

Figure 7B:
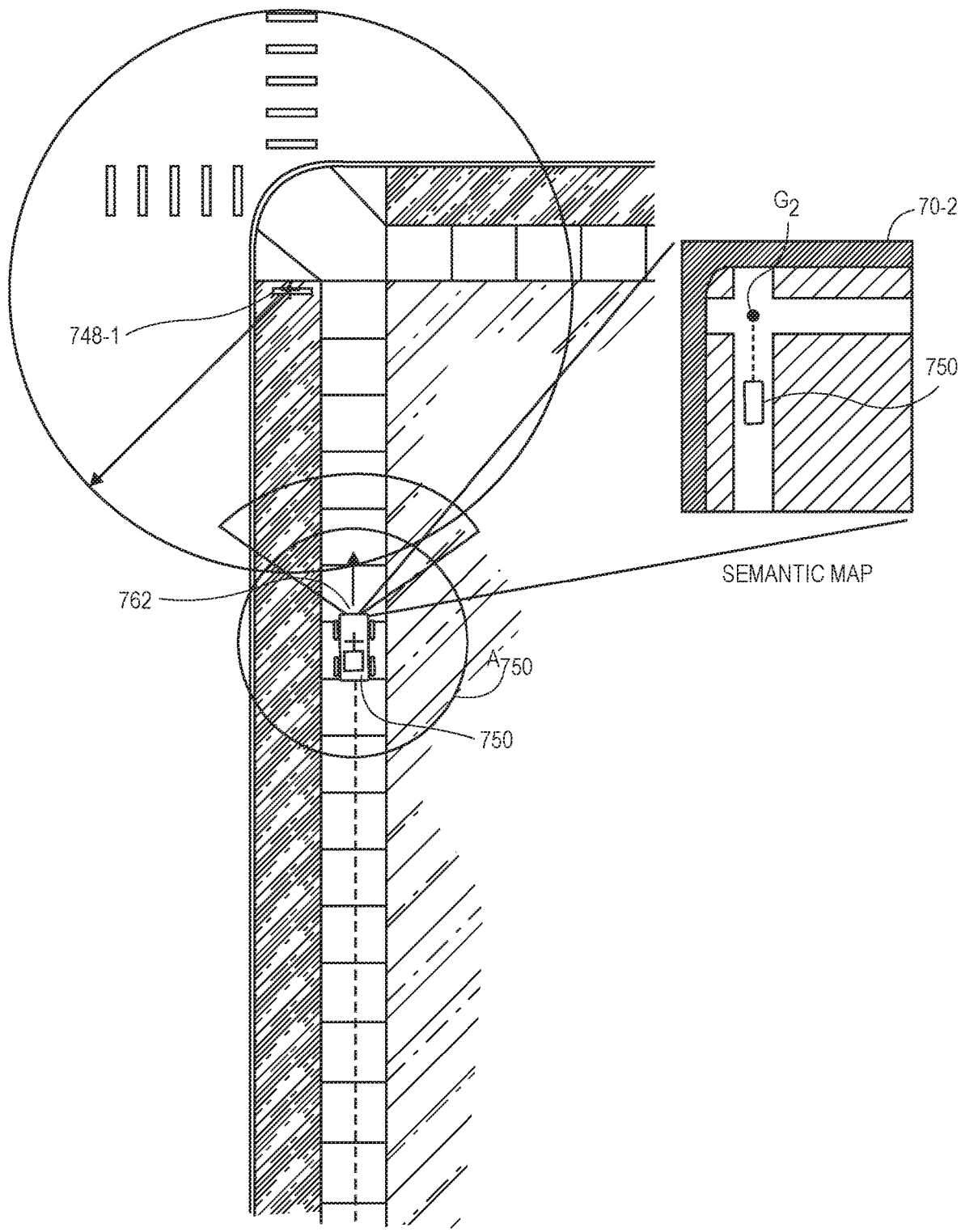

As is shown in FIG. 7B, the autonomous ground vehicle 750 continues to travel along the first sidewalk, and generates or updates semantic maps, e.g., a semantic map 70-2, based on images captured by the imaging device 762. The autonomous ground vehicle 750 continues to select points, e.g., a point $G_2$, on the generated or updated semantic maps, and to select one or more courses or speeds for remaining on the first sidewalk, and in furtherance of one or more goals, while traveling to locations associated with such points.

Figure 7C:
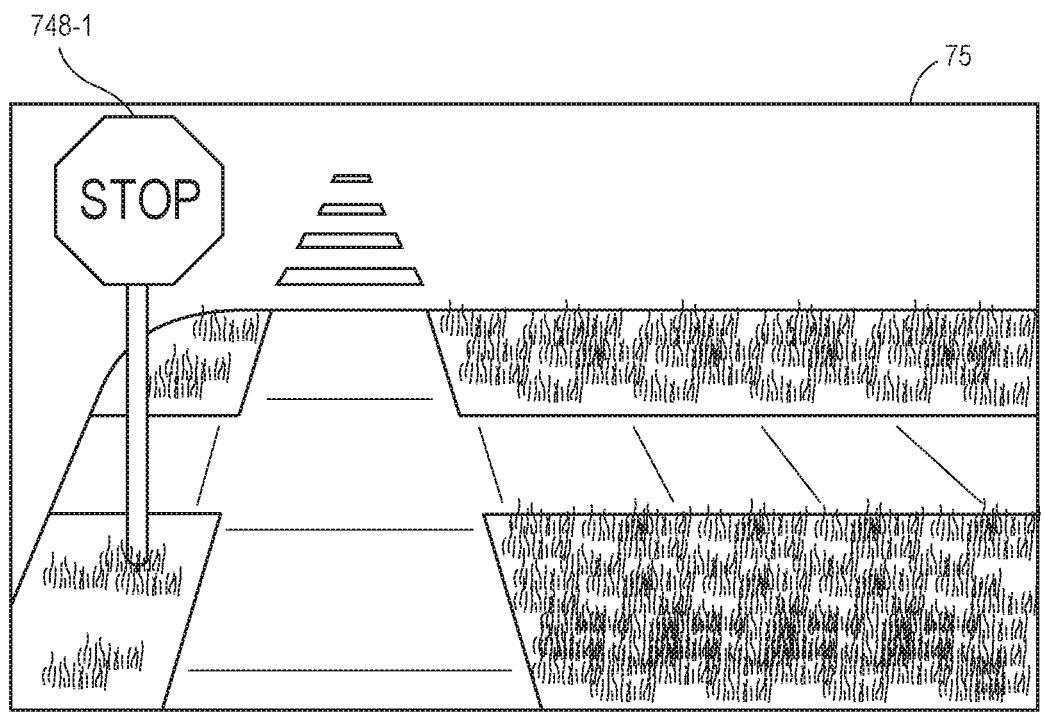

Additionally, when a position of the autonomous ground vehicle 750, or an area of uncertainty associated with the position, enters within a predetermined range of an expected location of the landmark 748-1, the autonomous ground vehicle 750 begins processing images captured using the imaging device 762, or semantic maps generated based on such images, to determine whether the landmark 748-1 is detected within such images or in such semantic maps. As is shown in FIG. 7C, upon detecting the landmark 748-1 within one or more images 75, or in a semantic map generated based on the images 75, the autonomous ground vehicle 750 may confirm the location of the autonomous ground vehicle 750 with respect to the landmark 748-1, with greater accuracy and precision than based on GPS-determines positions alone.

Figure 7D:
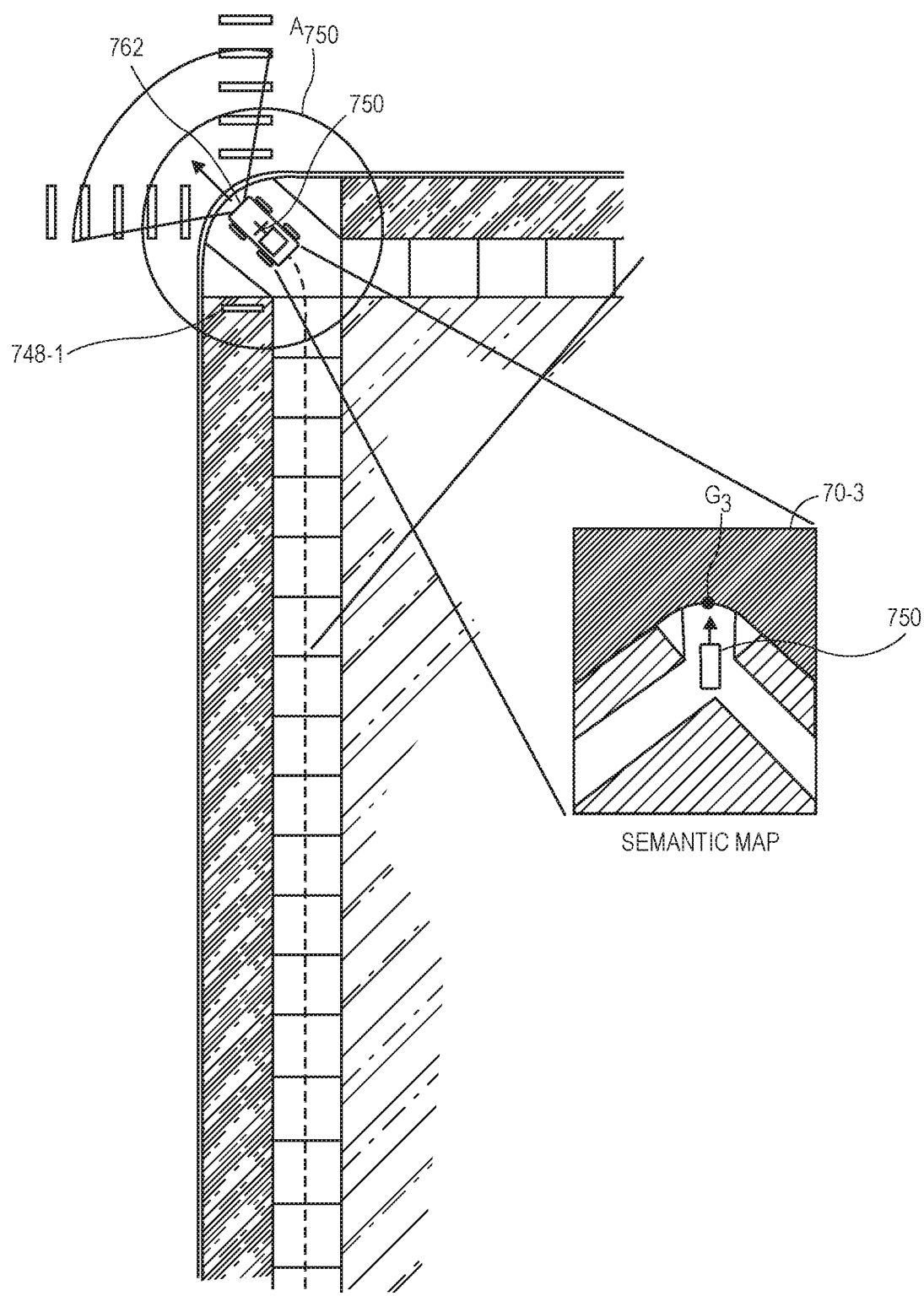

As is shown in FIG. 7D, after detecting the landmark 748-1, the autonomous ground vehicle 750 executes one or more changes in course or speed, e.g., to turn toward an intersection by way of an apron, and to enter a crosswalk at the intersection. In particular, the autonomous ground vehicle 750 continues to capture images by the imaging device 762 while executing the changes in course or speed, and to generate or update semantic maps, e.g., a semantic map 70-3, based on the captured images. The autonomous ground vehicle 750 continues to select points, e.g., a point $G_3$, on the semantic map 70-3, and to select one or more courses or speeds for traveling to a location corresponding to the point $G_3$, and in furtherance of one or more goals.

Figure 7E:
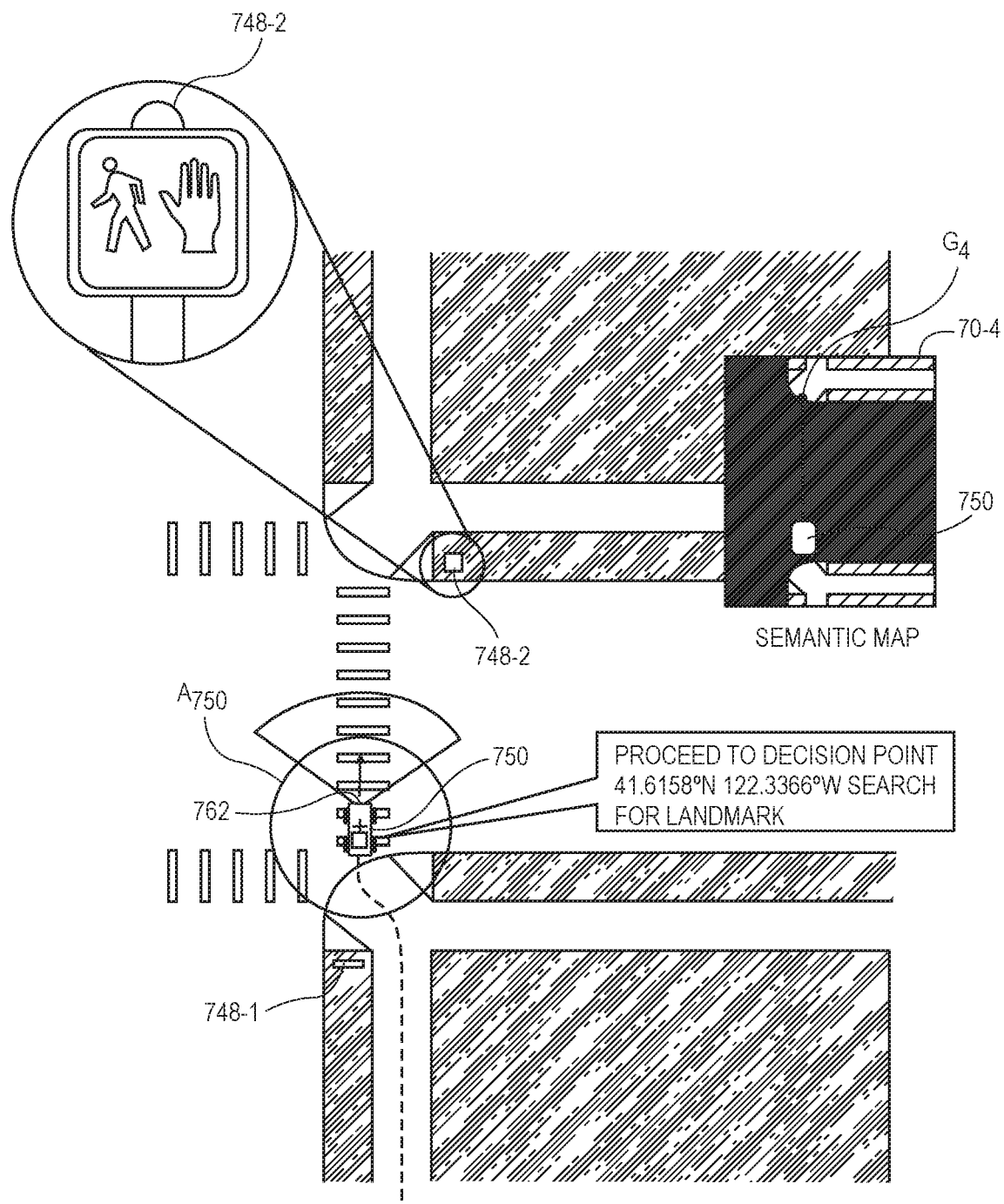

As is shown in FIG. 7E, the autonomous ground vehicle 750 travels along the crosswalk at the intersection, and generates or updates semantic maps, e.g., a semantic map 70-4, based on images captured by the imaging device 762. The autonomous ground vehicle 750 selects a point $G_4$ on an opposite side of the street corresponding to an apron for accessing a second sidewalk on the opposite side of the street, and selects one or more courses or speeds for traveling on the crosswalk to a location corresponding to the point $G_4$, and in furtherance of one or more goals. The second sidewalk is aligned along the same axis, or a substantially similar axis, as the first sidewalk, yet, as is shown in FIGS. 7D and 7E, the autonomous ground vehicle 750 is required to execute a number of changes in course and/or speed in order to travel from the first sidewalk to the second sidewalk by way of the crosswalk. Additionally, the autonomous ground vehicle 750 begins processing images captured using the imaging device 762, or semantic maps generated based on such images, to determine whether a landmark 748-2, e.g., a pedestrian signal on the opposite side of the street, is detected within such images or in such semantic maps.

Figure 7F:
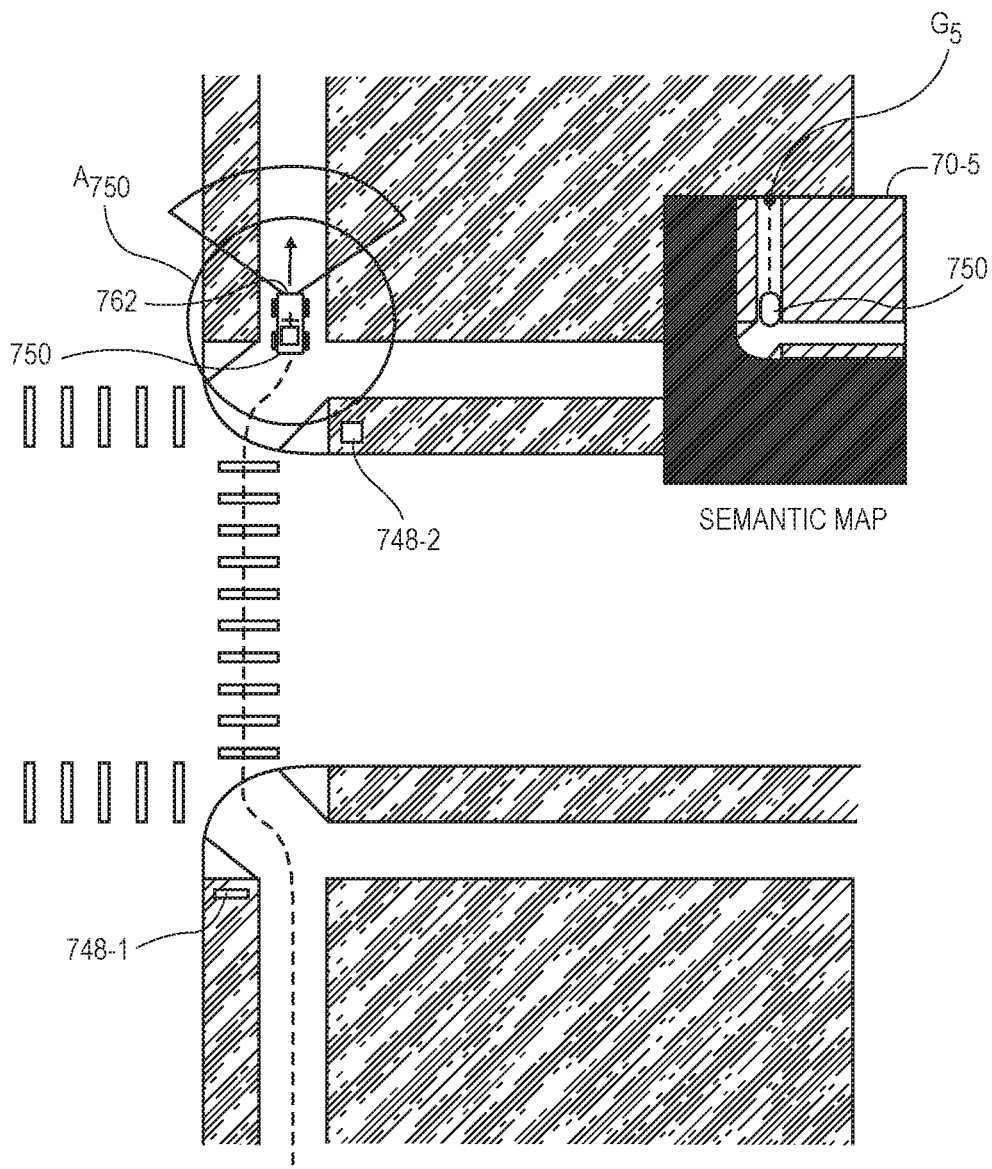

As is shown in FIG. 7F, after detecting the landmark 748-2, the autonomous ground vehicle 750 executes one or more changes in course or speed, e.g., to enter the second sidewalk on the opposite side of the street. In particular, the autonomous ground vehicle 750 continues to capture images by the imaging device 762 while executing the changes in course or speed, and to generate or update semantic maps, e.g., a semantic map 70-5, based on the captured images. The autonomous ground vehicle 750 continues to select points, e.g., a point $G_5$, on the semantic map 70-5, and to select one or more courses or speeds for traveling to a location corresponding to the point $G_5$, and in furtherance of one or more goals.

Accordingly, the systems and methods of the present disclosure enable autonomous ground vehicles to utilize semantic maps generated based on images captured thereby to select surfaces that are passable or desirable for travel thereon, or to avoid surfaces that are impassable or undesirable. Furthermore, the autonomous ground vehicles may confirm their proximity to one or more decision points or waypoints by searching for and detecting or recognizing one or more natural or artificial landmarks within the images. Moreover, because a semantic map may have real or scaled dimensions that are greater than the typical accuracy of traditional position systems, such as GPS, an autonomous ground vehicle may utilize semantic maps to finely select courses or speeds with greater granularity or specificity than by relying on GPS-determined positions alone.

For example, because the first sidewalk and the second sidewalk shown in FIGS. 7E and 7F are aligned along a common or substantially similar axis, an autonomous ground vehicle that is programmed to follow a path or route along the first sidewalk and the second sidewalk that is generated from GPS-determined positions alone may attempt to travel along the common or substantially similar axis, e.g., over curbs, grass or other less preferable surfaces, when proceeding from the first sidewalk to the second sidewalk. In accordance with embodiments of the present disclosure, however, an autonomous ground vehicle that is programmed to follow the same path or route along the first sidewalk and the second sidewalk may generate semantic maps, such as the semantic maps 70-1 through 70-5, from images captured thereby, detect passable or desirable surfaces such as the aprons and the crosswalk within such maps, and travel from the first sidewalk to the second sidewalk along the aprons and the crosswalk without having to travel over curbs, grass, or any other less preferable surfaces. Instead, the autonomous ground vehicle may execute course and speed changes as necessary, or upon detecting the landmarks 748-1, 748-2, to continue to travel in a direction consistent with the path or route while remaining on the passable or desirable surfaces.

Although some of the embodiments of the present disclosure depict deliveries of items to destinations by one or more autonomous ground vehicles, those of ordinary skill in the pertinent arts will recognize that the systems and methods of the present disclosure are not so limited. Rather, the systems and methods of the present disclosure may be utilized in connection with the performance of any type of mission using one or more autonomous ground vehicles, and are not limited to deliveries of items. Moreover, although some of the embodiments of the present disclosure depict autonomous ground vehicles that are small in size, those of ordinary skill in the pertinent arts will recognize that the systems and methods of the present disclosure are not so limited. Rather, autonomous ground vehicles may be of any size or shape, and may be configured or outfitted with components or features that enable such vehicles to capture information or data, such as imaging data, regarding ground conditions or to communicate with any extrinsic computer devices or systems in accordance with the present disclosure.

Moreover, those of ordinary skill in the pertinent arts will recognize that one or more of the computer systems disclosed herein may be configured to execute one or more optimal path or route algorithms (e.g., shortest path or shortest route algorithms) for providing guidance to or instructing one or more vehicle systems or couriers to travel to a selected area. A path or route may be identified as "optimal" on any objective or subjective basis. For example, an optimal path or route may have a lowest financial cost, a shortest time, or any other beneficial or preferential ranking or status according to one or more objective or subjective metrics.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIGS. 3A and 3B, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An autonomous ground vehicle comprising:
a frame;
a first imaging device having a first field of view;
a second imaging device having a second field of view;
a third imaging device having a third field of view;
at least one wheel;
a motor disposed within the frame, wherein the motor is configured to cause the at least one wheel to rotate at a speed within a predetermined speed range;
at least one power module for powering the motor;
a position sensor;
at least one computer processor; and
at least one memory component,
wherein the at least one computer processor is configured to execute one or more sets of computer instructions for causing the autonomous ground vehicle to execute a method comprising:
identifying, by the at least one processor, a location associated with a destination for the autonomous ground vehicle;
determining a first course for the autonomous ground vehicle to the location associated with the destination;
causing the autonomous ground vehicle to travel on a first ground surface on the first course, wherein the first ground surface is at least a portion of a sidewalk;
while the autonomous ground vehicle is traveling on the first course,
capturing at least a first image by at least one of the first imaging device, the second imaging device or the third imaging device;
providing at least the first image as an input to a segmentation network executed by the at least one computer processor, wherein the segmentation network is trained to at least assign a label to at least one pixel based at least in part on a ground surface depicted in the at least one pixel;
receiving at least one output from the segmentation network;
recognizing a plurality of ground surfaces depicted within the first image based at least in part on the at least one output, wherein the first ground surface is one of the plurality of ground surfaces;
generating, by the at least one computer processor, a semantic representation of the plurality of ground surfaces;
selecting a point on the semantic representation, wherein the point is within a region of the semantic representation corresponding to the first ground surface;
selecting a second course for travel to a location on the first ground surface associated with the selected point; and
causing the autonomous ground vehicle to travel on the second course to the location on the first ground surface associated with the selected point,
wherein the second field of view overlaps with at least the first field of view,
wherein the third field of view overlaps with at least the first field of view, and
wherein the first field of view, the second field of view and the third field of view cover at least one hundred eighty degrees of a perimeter of the autonomous ground vehicle.

2. The autonomous ground vehicle of claim 1, wherein selecting the point on the semantic representation comprises:
determining at least one goal for the autonomous ground vehicle, wherein the goal is at least one of:
maintaining a minimum distance between the autonomous ground vehicle and a second ground surface, wherein the second ground surface is one of the plurality of ground surfaces;
maintaining the second ground surface on a selected side of the autonomous ground vehicle;
avoiding an obstacle on the first ground surface; or
traveling on approximately a centerline of the first ground surface; and
selecting the point on the semantic representation in accordance with the at least one goal.

3. The autonomous ground vehicle of claim 1, wherein the method further comprises:
while the autonomous ground vehicle is traveling on the second course,
capturing at least a second image by the at least one of the first imaging device, the second imaging device or the third imaging device;
detecting a landmark associated with the destination within at least the second image; and
in response to detecting the landmark;
determining that the autonomous ground vehicle is within a vicinity of a location associated with the destination;
selecting a third course for travel to the location associated with the destination; and
causing the autonomous ground vehicle to travel on the third course to the location associated with the destination.

4. The autonomous ground vehicle of claim 1, wherein the semantic representation has at least one scaled dimension greater than eight meters.

5. A method comprising:
causing an autonomous ground vehicle to travel on a first course and at a first speed;
capturing, by at least one imaging device provided aboard the autonomous ground vehicle, at least a first image with the autonomous ground vehicle traveling on the first course and at the first speed;
recognizing at least a first ground surface and a second ground surface depicted within the first image;
generating a first representation of ground surfaces within a vicinity of the autonomous ground vehicle, wherein the first representation comprises a first set of pixels corresponding to the first ground surface and a second set of pixels corresponding to the second ground surface;
selecting a point within the first set of pixels on the first representation, wherein the point corresponds to a first location on the first ground surface;
selecting at least one of a second course or a second speed for the autonomous ground vehicle based at least in part on the selected point within the first set of pixels on the first representation; and
causing the autonomous ground vehicle to travel to the first location on the first ground surface on the second course or at the second speed,
wherein the at least one imaging device comprises a first imaging device having a first field of view extending forward of the autonomous ground vehicle at least in part, a second imaging device having a second field of view, and a third imaging device having a third field of view, wherein the second field of view overlaps the first field of view, wherein the third field of view overlaps with the first field of view, and wherein the first field of view, the second field of view and the third field of view cover at least one hundred eighty degrees of a perimeter of the autonomous ground vehicle.

6. The method of claim 5, further comprising:

determining, by a position sensor provided aboard the autonomous ground vehicle, a second location of the autonomous ground vehicle;

receiving, by the autonomous ground vehicle, instructions to travel to a third location;

determining a route from the second location to the third location, wherein the route comprises at least a first path; and selecting at least the first course based at least in part on the first path.

7. The method of claim 5, wherein the first image is captured at a first time, and wherein the method further comprises:

capturing, by the at least one imaging device, at least a second image at a second time, wherein the second time precedes the first time;

recognizing the first ground surface and at least one of the second ground surface or a third ground surface depicted within the second image;

generating a second representation of ground surfaces within a vicinity of the autonomous ground vehicle at the second time, wherein the second representation comprises a third set of pixels corresponding to the first ground surface and a fourth set of pixels corresponding to the at least one of the second ground surface or the third ground surface;

selecting a point within the third set of pixels on the second representation, wherein the point corresponds to a second location on the first ground surface; and selecting at least the first course based at least in part on the selected point within the third set of pixels.

8. The method of claim 5, wherein recognizing at least the first ground surface and the second ground surface depicted within the first image comprises:

providing at least the first image as an input to a segmentation network, wherein the segmentation network is trained to at least assign a label to at least one pixel based at least in part on a ground surface depicted by the at least one pixel;

receiving at least one output from the segmentation network;

determining that the first set of pixels is associated with a first label based at least in part on the at least one output, wherein the first label corresponds to the first ground surface; and determining that the second set of pixels is associated with a second label based at least in part on the at least one output, wherein the second label corresponds to the second ground surface.

9. The method of claim 5, further comprising:

capturing, by the at least one imaging device, at least a second image with the autonomous ground vehicle traveling on the second course or at the second speed, wherein the first image is captured at a first time, wherein the second image is captured at a second time, and wherein the second time follows the first time;

recognizing the first ground surface and at least one of the second ground surface or a third ground surface depicted within the second image;

generating a second representation of ground surfaces within a vicinity of the autonomous ground vehicle at the second time, wherein the second representation comprises a third set of pixels corresponding to the first ground surface and a fourth set of pixels corresponding to the at least one of the second ground surface or the third ground surface;

selecting a point within the third set of pixels on the second representation, wherein the point corresponds to a second location on the first ground surface;

selecting at least one of a third course or a third speed for the autonomous ground vehicle based at least in part on the selected point within the third set of pixels; and causing the autonomous ground vehicle to travel to the second location on the first ground surface on the third course or at the third speed.

10. The method of claim 5, further comprising determining a goal associated with the autonomous ground vehicle, wherein the point on the first representation is selected in accordance with the goal.

11. The method of claim 10, wherein the goal is one of:

maintaining a minimum distance between the autonomous ground vehicle and the second ground surface;

maintaining the second ground surface on a selected side of the autonomous ground vehicle;

avoiding an obstacle on the first ground surface; or traveling on approximately a centerline of the first ground surface.

12. A method comprising:

causing an autonomous ground vehicle to travel on a first course and at a first speed;

capturing, by at least one imaging device provided aboard the autonomous ground vehicle, at least a first image with the autonomous ground vehicle traveling on the first course and at the first speed;

recognizing at least a first ground surface and a second ground surface depicted within the first image;

generating a first representation of ground surfaces within a vicinity of the autonomous ground vehicle, wherein the first representation comprises a first set of pixels corresponding to the first ground surface and a second set of pixels corresponding to the second ground surface, wherein the first representation has at least one scaled dimension greater than eight meters;

selecting a point within the first set of pixels on the first representation, wherein the point corresponds to a first location on the first ground surface;

selecting at least one of a second course or a second speed for the autonomous ground vehicle based at least in part on the selected point within the first set of pixels on the first representation; and causing the autonomous ground vehicle to travel to the first location on the first ground surface on the second course or at the second speed.

13. The method of claim 5, wherein the first ground surface is formed from at least one of cement or concrete, and wherein the second ground surface is formed from at least one of asphalt, pavement or water.

14. The method of claim 5, wherein the first ground surface is a sidewalk, and wherein the second ground surface is one of a road or a grass.

15. The method of claim 5, further comprising:

determining, by a position sensor provided aboard the autonomous ground vehicle, that the autonomous ground vehicle is within a predetermined range of a second location;

capturing, by the at least one imaging device, at least a second image with the autonomous ground vehicle traveling on the second course or at the second speed;

determining that the second image depicts a landmark associated with the second location;

in response to determining that the second image depicts the landmark,
selecting at least one of a third course or a third speed for the autonomous ground vehicle; and
causing the autonomous ground vehicle to travel on the third course or at the third speed.

16. The method of claim 5, wherein the autonomous ground vehicle further comprises:

a frame, wherein the at least one sensor is coupled to the frame;
at least one wheel;
a motor disposed within the frame, wherein the motor is configured to cause the at least one wheel to rotate at a speed within a predetermined speed range;
at least one power module for powering the motor;
a position sensor;
at least one computer processor; and
at least one memory component.

17. A distribution system comprising:

a fulfillment center;
an autonomous ground vehicle having a first imaging device having a first field of view extending forward of the autonomous ground vehicle at least in part, a second imaging device having a second field of view overlapping the first field of view at least in part, and a third imaging device having a third field of view overlapping the first field of view at least in part, wherein the first field of view, the second field of view and the third field of view cover at least one hundred eighty degrees of a perimeter of the autonomous ground vehicle; and
at least one computer system in communication with the autonomous ground vehicle, wherein the at least one computer system is configured to execute a method comprising:
receiving an order for a delivery of an item from the fulfillment center to a destination;
causing the autonomous ground vehicle to travel on a first course and at a first speed;
causing the autonomous ground vehicle to capture a plurality of images while traveling on the first course and at the first speed;
processing the plurality of images to recognize a plurality of ground surfaces within a vicinity of the autonomous ground vehicle;
generating a representation of the plurality of ground surfaces, wherein the representation comprises a plurality of sets of pixels, and wherein each of the plurality of sets of pixels corresponds to one of the plurality of ground surfaces;
selecting a point on the representation, wherein the point on the representation corresponds to a location on a first ground surface, and wherein the first ground surface is one of the plurality of ground surfaces;
selecting at least one of a second course or a second speed for the autonomous ground vehicle based at least in part on the location on the first ground surface; and
causing the autonomous ground vehicle to travel on the second course or at the second speed to the location on the first ground surface.

18. The distribution system of claim 17, wherein processing the plurality of images to recognize a plurality of ground surfaces within the vicinity of the autonomous ground vehicle comprises:

providing at least a first image as an input to a segmentation network, wherein the segmentation network is trained to at least assign a label to at least one pixel based at least in part on a ground surface depicted in the pixel;
receiving at least one output from the segmentation network;
determining that a first set of pixels of the first image is associated with a first label based at least in part on the at least one output, wherein the first label corresponds to the first ground surface; and
determining that the second set of pixels is associated with a second label based at least in part on the at least one output, wherein the second label corresponds to a second ground surface.

19. The distribution system of claim 17, wherein the point on the representation is selected in accordance with a goal, and wherein the goal is at least one of:
maintaining a minimum distance between the autonomous ground vehicle and a second ground surface, wherein the second ground surface is one of the plurality of ground surfaces;
maintaining the second ground surface on a selected side of the autonomous ground vehicle;
avoiding an obstacle on the first ground surface; or
traveling on approximately a centerline of the first ground surface.

20. The distribution system of claim 17, wherein the representation has at least one scaled dimension greater than eight meters.

* * * * *